(12) United States Patent
Aihara et al.

(10) Patent No.: US 10,237,058 B2
(45) Date of Patent: Mar. 19, 2019

(54) IDENTIFICATION OF ARTIFICAIL OBJECT AND ARTIFICAL OBJECT USED THEREIN

(71) Applicant: International Business Machines Corporation, Armonk, NY (US)

(72) Inventors: Toru Aihara, Tokyo (JP); Tadanobu Inoue, Tokyo (JP); Noboru Kamijo, Tokyo (JP); Takeo Nakada, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 363 days.

(21) Appl. No.: 14/938,989

(22) Filed: Nov. 12, 2015

(65) Prior Publication Data
US 2017/0141915 A1 May 18, 2017

(51) Int. Cl.
*H04L 9/08* (2006.01)
*G01R 27/26* (2006.01)
(Continued)

(52) U.S. Cl.
CPC ........ *H04L 9/0816* (2013.01); *G01R 27/2605* (2013.01); *G06F 21/30* (2013.01);
(Continued)

(58) Field of Classification Search
CPC .............. G01R 27/2605; H04L 9/0816; H04L 2209/24; G06K 9/00; G06K 9/6202; G01D 5/24; G04W 12/06
See application file for complete search history.

(56) References Cited

U.S. PATENT DOCUMENTS

| 8,386,793 B2 | 2/2013 | Wang et al. |
| 8,750,802 B2 | 6/2014 | Matsubara et al. |

(Continued)

FOREIGN PATENT DOCUMENTS

| CN | 103941996 A | 7/2014 |
| JP | 2012256246 A | 12/2012 |

OTHER PUBLICATIONS

Bin, et al, "Electronic Seal System Based on RSA Algorithm and Public-Key Infrastructure," 2nd International Conference on Networking and Digital Society (ICNDS), 2010, vol. 1.

*Primary Examiner* — Mohammad A Siddiqi
(74) *Attorney, Agent, or Firm* — Vazken Alexanian

(57) ABSTRACT

The present invention can be a method, system, and computer program product. One embodiment of the present invention provides a computer-implemented method for identifying an artificial object. The method includes receiving capacitance data which is obtained by measuring with at least one electrodes in a sensor at least one predefined surfaces of the artificial object placed against the sensor; converting each of the obtained capacitance data into an evaluation level in an evaluation system having more than two evaluation levels, to obtain a capacitance distribution on the surface of the artificial object; determining whether the obtained capacitance distribution matches a pre-registered capacitance distribution or one of pre-registered capacitance distributions; and if the determination result is positive, concluding the artificial object is identified. The method can further include identifying or performing an authentication of a user associated with the artificial object when artificial object is identified.

44 Claims, 18 Drawing Sheets

(51) Int. Cl.
  *G06K 9/00* (2006.01)
  *G06K 9/62* (2006.01)
  *G06F 21/30* (2013.01)
  *G06F 21/64* (2013.01)

(52) U.S. Cl.
  CPC ............... *G06F 21/64* (2013.01); *G06K 9/00* (2013.01); *G06K 9/6202* (2013.01); *H04L 2209/24* (2013.01)

(56) References Cited

U.S. PATENT DOCUMENTS

| | | | |
|---|---|---|---|
| 8,948,839 B1* | 2/2015 | Longinotti-Buitoni | A61B 5/6804 29/825 |
| 9,013,425 B2* | 4/2015 | Fuller | G06F 3/044 345/173 |
| 9,762,399 B2* | 9/2017 | Ghose | H04L 9/3247 |
| 2003/0020236 A1* | 1/2003 | Tuveson | A63F 3/00214 273/261 |
| 2005/0035545 A1* | 2/2005 | Lee | A63F 3/00094 273/237 |
| 2005/0077678 A1* | 4/2005 | Bibi | A63F 3/00895 273/284 |
| 2007/0062852 A1* | 3/2007 | Zachut | A63F 3/00643 209/683 |
| 2009/0017889 A1* | 1/2009 | Zhukov | A63F 3/00643 463/14 |
| 2011/0096955 A1* | 4/2011 | Voloshynovskiy | G06K 9/00 382/103 |
| 2013/0044078 A1* | 2/2013 | Hallenberg | G06F 3/039 345/174 |
| 2013/0224632 A1* | 8/2013 | Roumi | H01M 2/166 429/516 |
| 2015/0002445 A1* | 1/2015 | Brunet | G06F 3/044 345/174 |
| 2016/0226308 A1* | 8/2016 | Valin | H02J 7/355 |
| 2016/0241660 A1* | 8/2016 | Nhu | H04L 67/26 |
| 2017/0242504 A1* | 8/2017 | Hanson | G06F 3/041 |

* cited by examiner

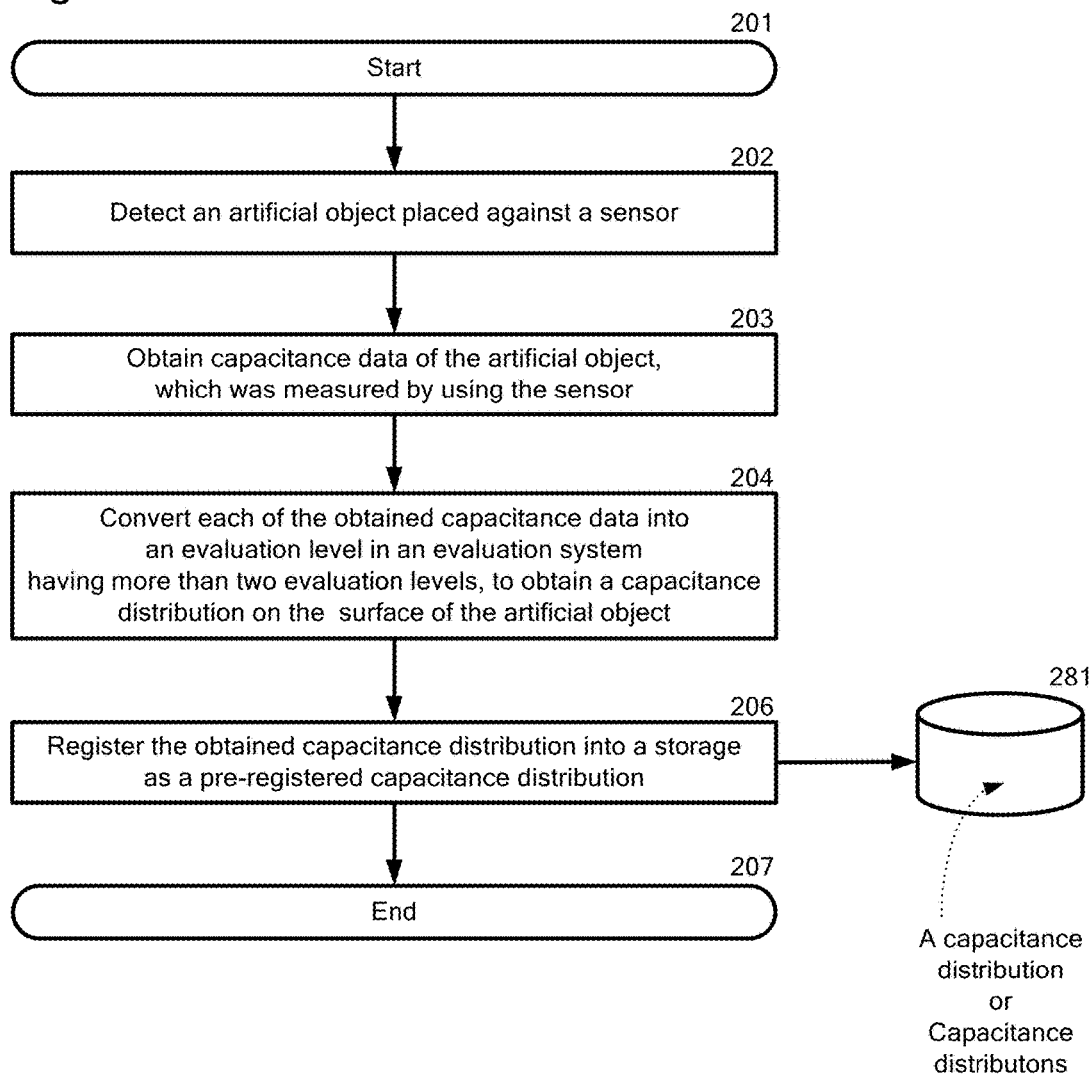

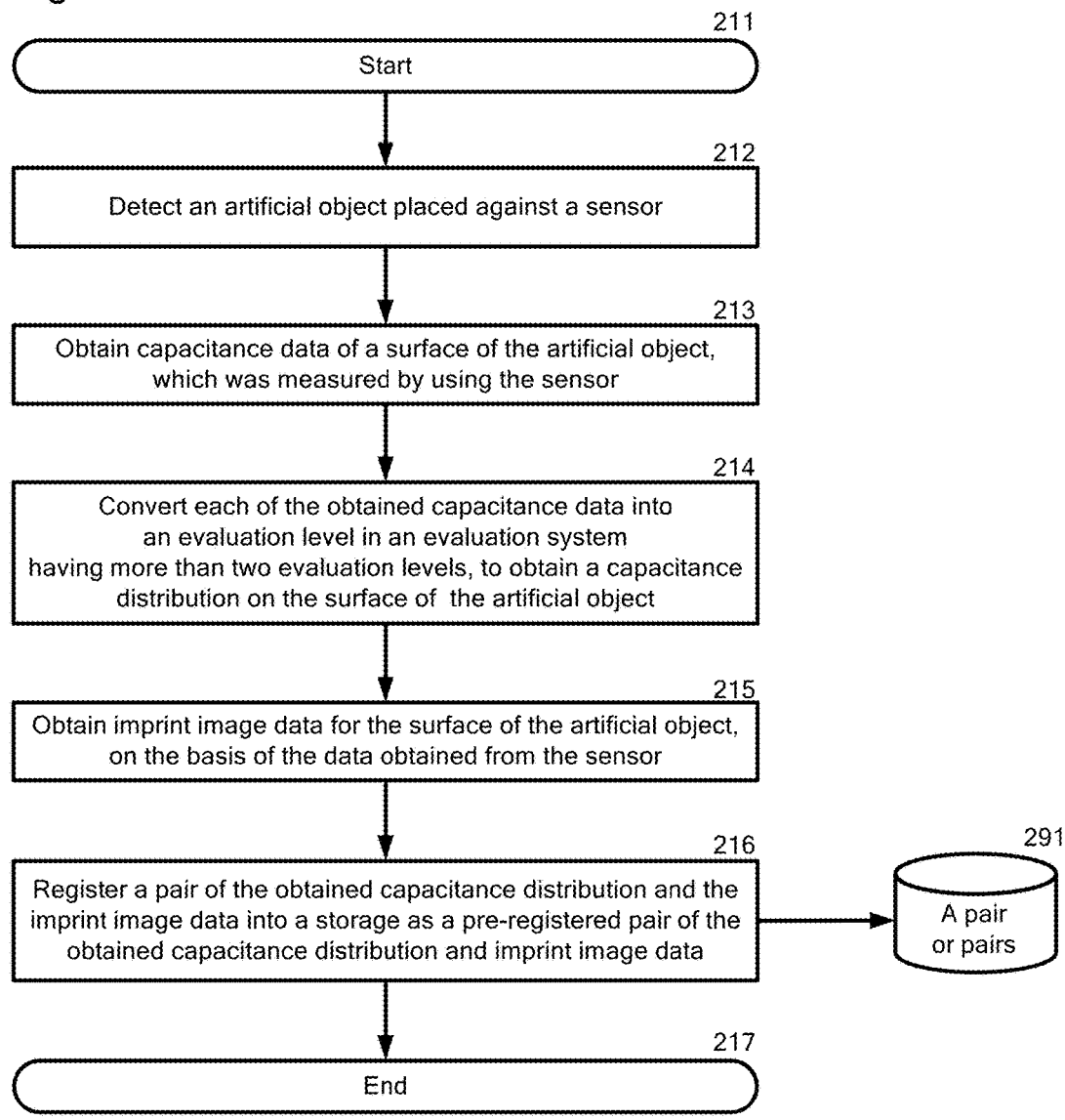

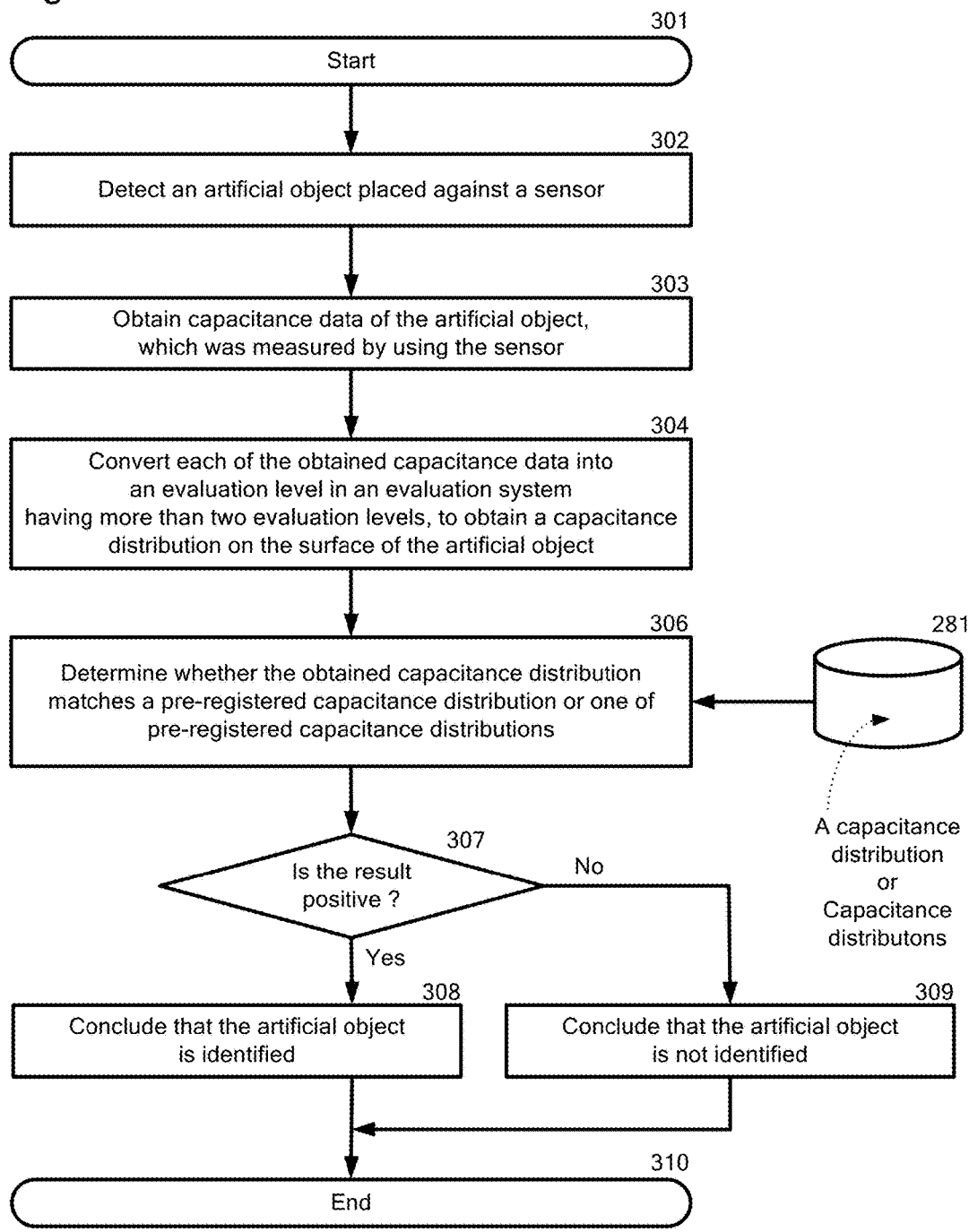

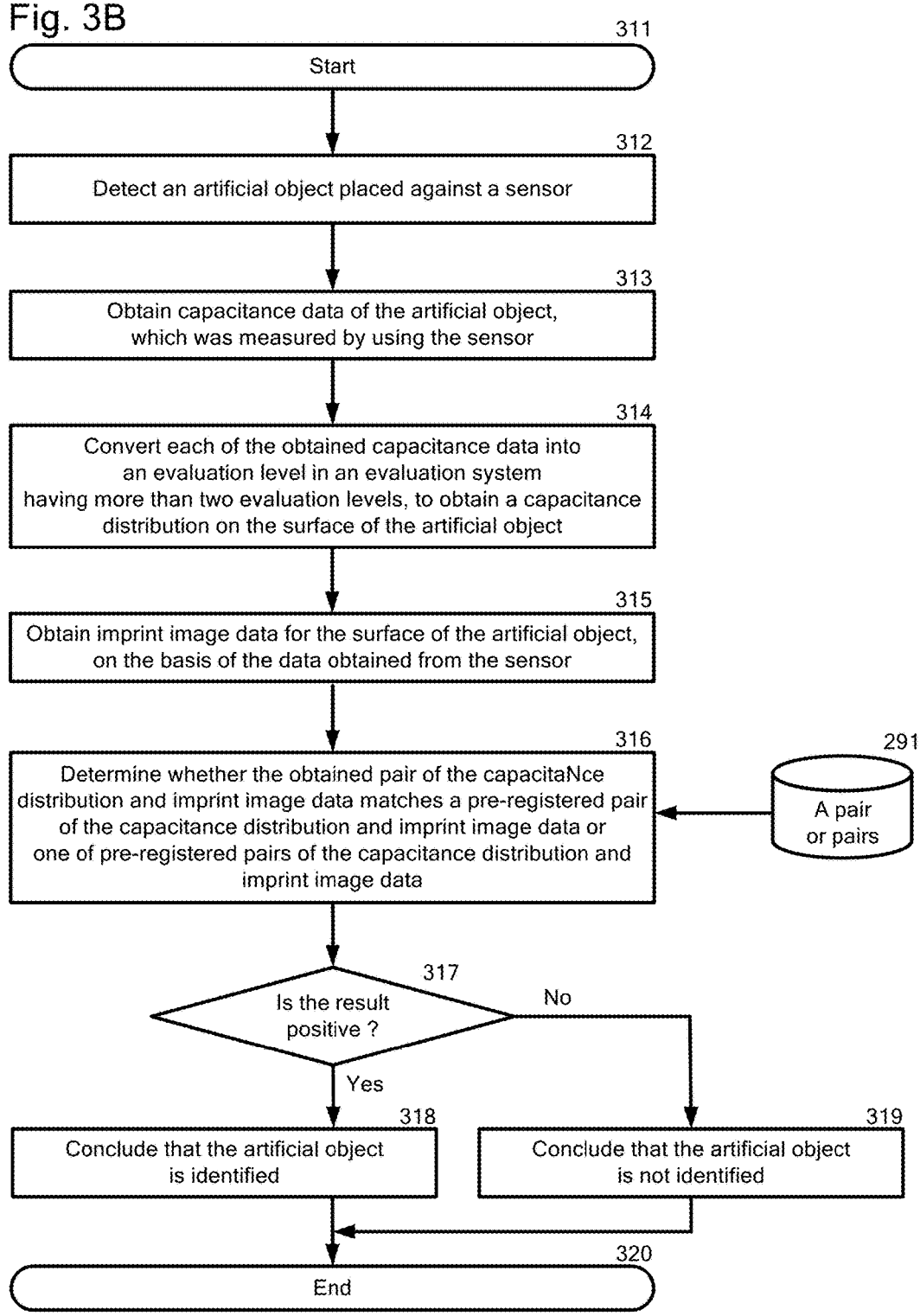

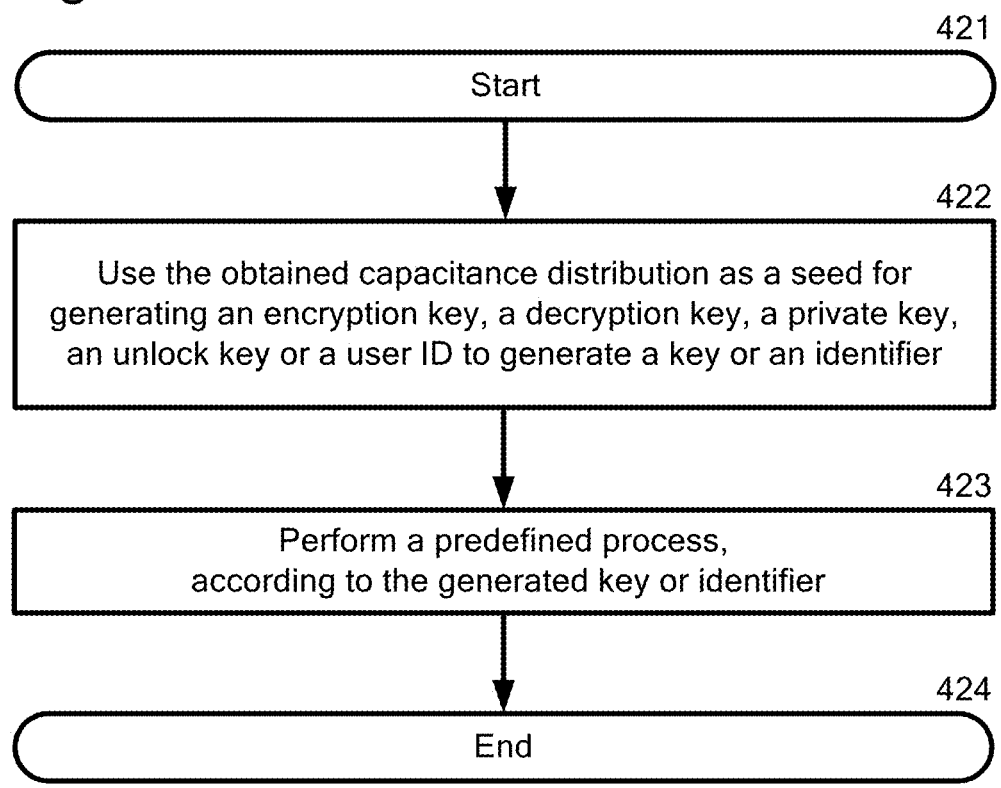

Fig. 5A
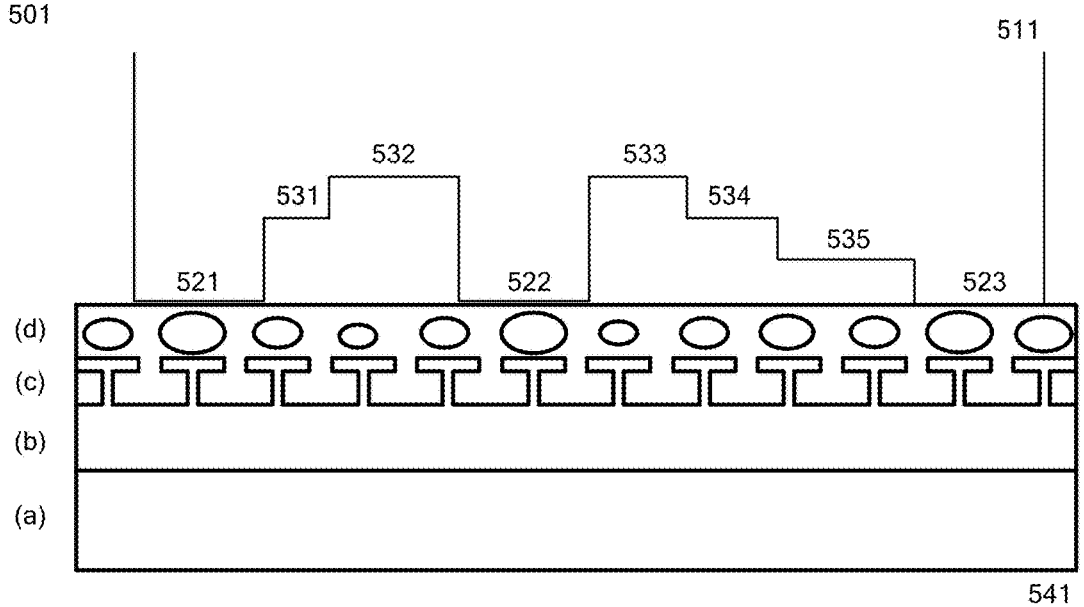
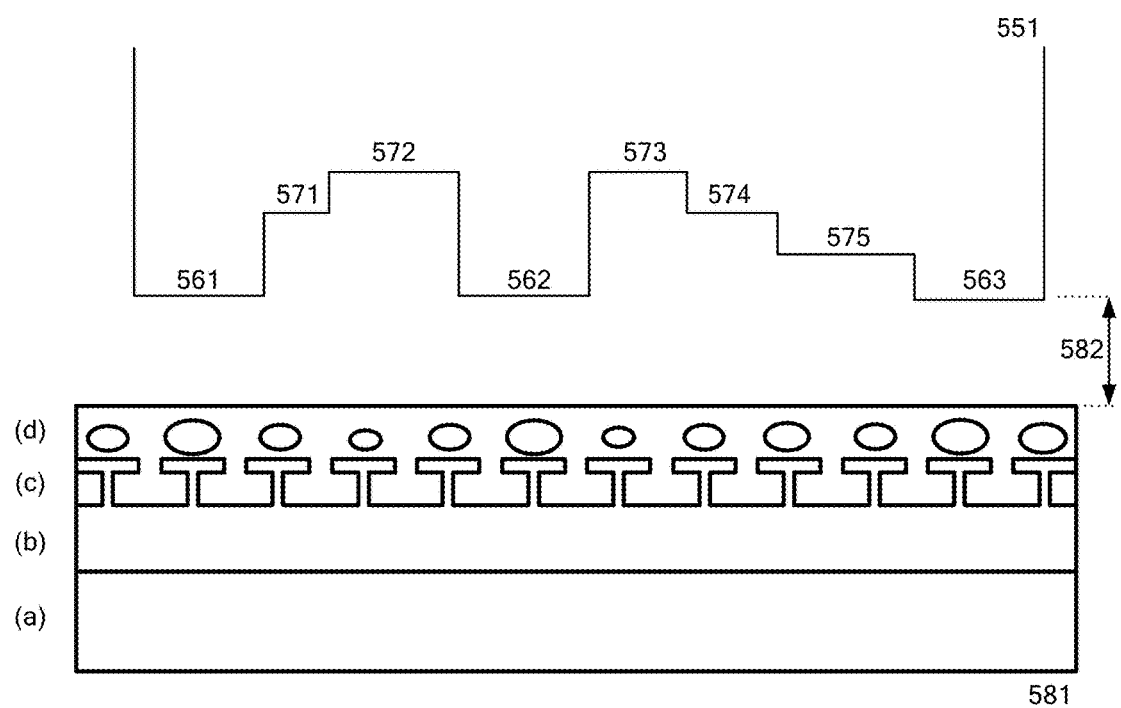

Fig. 6B
605
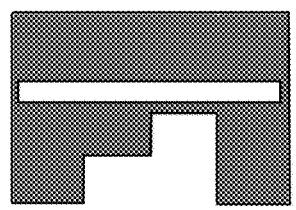 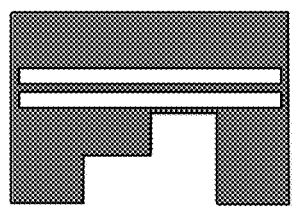 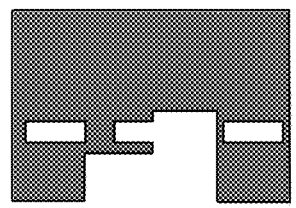
651        652        653
606
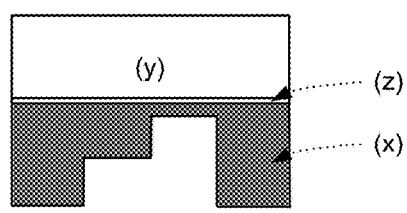
661
607
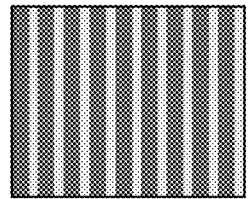 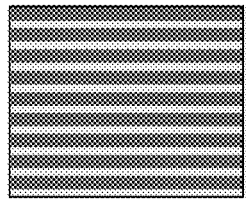 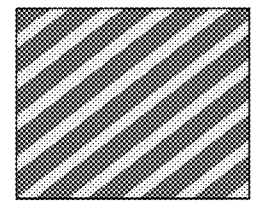
671        672        673
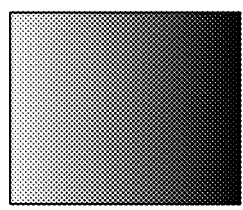 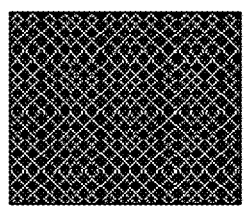
674        675

Fig. 7A
701
Please press your signet on here to confirm your authentication.
711
Please touch your card key on the card reader to enter the security area.
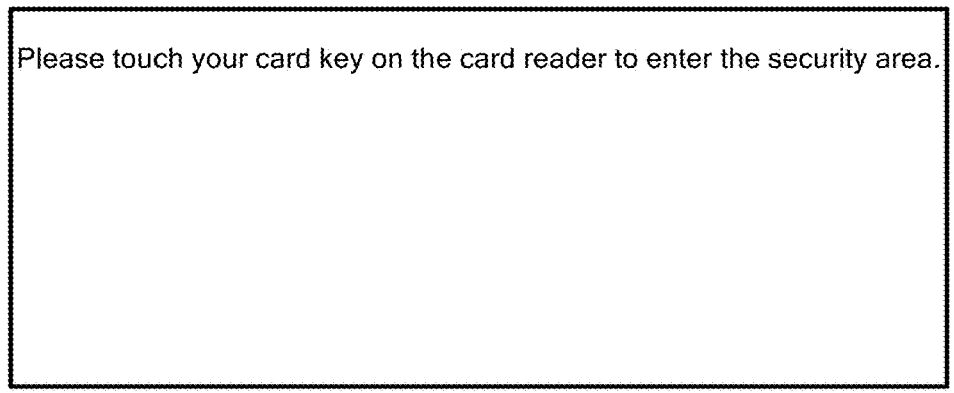
721
Report
722  723
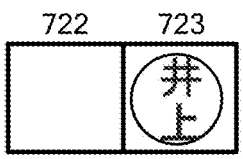

IDENTIFICATION OF ARTIFICAIL OBJECT AND ARTIFICAL OBJECT USED THEREIN

BACKGROUND

This invention relates to an identification of an artificial object and, especially, identifying an artificial object by a sensor which can measure capacitance. Further, this invention relates to an artificial object used therein.

It is an ordinary practice to seal documents as an approval in Japan and People's Republic of China and the like. E-document Law went into effect in Japan in April 2005. The E-document Law permits companies to electronically store the documents which are legally required to retain, such as financial documents, accounting records and tax documents.

Japanese Patent Application Laid-Open No. 2002-300157 describes the electronic seal stamp system including an electronic seal stamp provided with a storage means that stores particular ID number information, with a means including the ID number information onto an electromagnetic wave, and with a means that transmits the electromagnetic wave including the ID number information. Japanese Patent Application Laid-Open No. 2012-118637 describes an authentication system including a tablet type computer using a capacitance system touch panel, and an electronic seal which can input identification information comprised of a capacitance variation in the tablet type computer.

U.S. Pat. No. 7,683,888 describes a system and method for recognizing a signet and for performing an action associated with the signet, wherein the signet is an inanimate object, and the method includes generating a touch signal with a signet, the touch signal representing a particular signet pattern, recognizing the particular signet pattern, and performing an action associated with the particular signet pattern.

However, both of the electronic seal stamps described in Japanese Patent Applications Laid-Open Nos. 2002-300157 and 2012-118637 need power supplies and electrical circuits inside a seal and they are costly. Further, it is undesirable that signets can be easily duplicated by referring signet patterns, which causes a security problem, in the invention described in U.S. Pat. No. 7,683,888.

SUMMARY

It is an object of the present invention to provide an electrical seal system using low cost seals which can be used as usual seals for documents. Further, it is another object of the present invention to provide a more secure electrical seal system using the low cost seals.

According to one aspect of the present invention there is provided a method for identifying an artificial object. The method can be implemented in a computer or a hardware processor such as neuromorphic chip, for example, IBM® TrueNorth chip. The method includes receiving capacitance data which is obtained by measuring with at least one electrodes in a sensor at least one predefined surfaces of the artificial object placed against the sensor; converting each of the obtained capacitance data into an evaluation level in an evaluation system having more than two evaluation levels, to obtain a capacitance distribution on the surface of the artificial object; determining whether the obtained capacitance distribution matches a pre-registered capacitance distribution or one of pre-registered capacitance distributions; and concluding that the artificial object is identified if the determination result is positive.

According to another aspect of the present invention, a system such as a computer system including a computer readable storage medium storing a program of instructions executable by the system to perform at least one method described herein can be provided. The system includes a processor and a memory storing a program, which, when executed on the processor, performs an operation for identifying an artificial object. The operation includes receiving capacitance data which is obtained by measuring with at least one electrodes in a sensor at least one predefined surfaces of the artificial object placed against the sensor; converting each of the obtained capacitance data into an evaluation level in an evaluation system having more than two evaluation levels, to obtain a capacitance distribution on the surface of the artificial object; determining whether the obtained capacitance distribution matches a pre-registered capacitance distribution or one of pre-registered capacitance distributions; and concluding that the artificial object is identified if the determination result is positive.

According to one aspect of the present invention, a computer readable non-transitory article of manufacture tangibly embodying computer readable instructions which, when executed, cause a computer to carry out the steps of a method including: receiving capacitance data which is obtained by measuring with at least one electrodes in a sensor at least one predefined surfaces of the artificial object placed against the sensor; converting each of the obtained capacitance data into an evaluation level in an evaluation system having more than two evaluation levels, to obtain a capacitance distribution on the surface of the artificial object; determining whether the obtained capacitance distribution matches a pre-registered capacitance distribution or one of pre-registered capacitance distributions; and concluding that the artificial object is identified if the determination result is positive.

BRIEF DESCRIPTION OF THE DRAWINGS

Some preferable embodiments will be described in more detail with reference to the accompanying drawings, where the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

FIG. 2A illustrates one embodiment of a flowchart of a process for registering a capacitance distribution on a surface of an artificial object into storage as a pre-registered capacitance distribution.

FIG. 2B illustrates another embodiment of a flowchart of a process for registering a pair of a capacitance distribution on a surface of an artificial object and imprints image data into storage as a pre-registered pair of a capacitance distribution and imprint image data.

FIG. 3A illustrates one embodiment of a flowchart of a process for determining whether an obtained capacitance distribution matches the pre-registered capacitance distribution or one of pre-registered capacitance distributions.

FIG. 3B illustrates one embodiment of a flowchart of a process for determining whether a pair of an obtained capacitance distribution and imprint image data matches a pair of the pre-registered capacitance distribution and imprint image data or one of pairs of a pre-registered capacitance distribution and imprint image data.

FIG. 4C illustrates one embodiment of a flowchart of a process for using the obtained capacitance distribution as a seed for generating a key or an ID.

FIG. 5A illustrates embodiments of detection of an artificial object on a sensor.

FIG. 6B illustrates embodiments of a variety of artificial objects.

FIG. 7A illustrates embodiments of a variety of user interfaces used in accordance with an embodiment of the present invention.

DETAILED DESCRIPTION

Figure 1A:
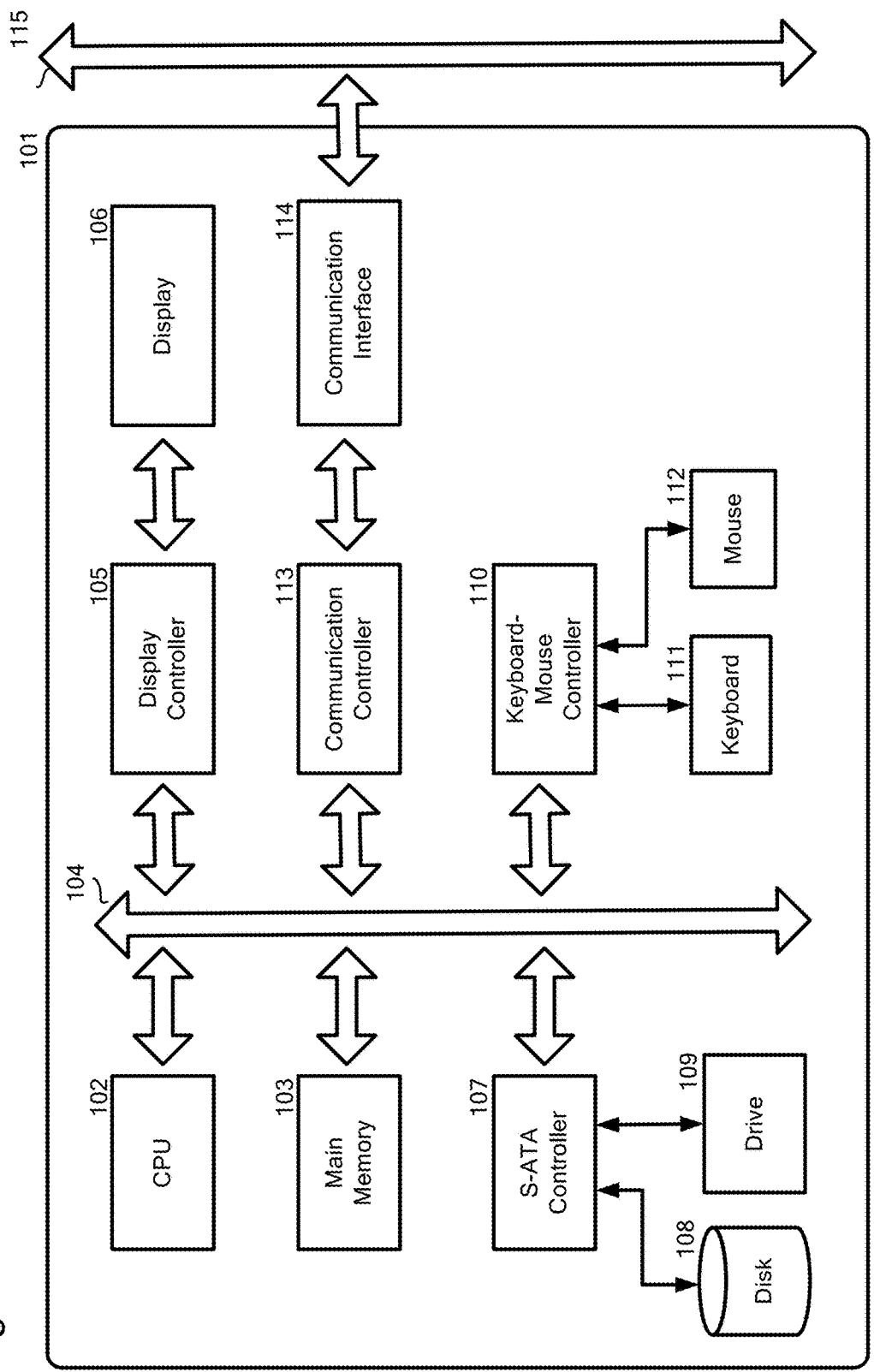
FIG. 1A illustrates an exemplified basic block diagram of a device used in an embodiment of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. To define more clearly the terms used herein, the following exemplified definitions are provided, but the meaning of the terms can be interpreted broadly as known to the technical field to which the present invention relates.

The term, "an artificial object" can refer to any object other than natural products. In the present invention, the artificial object which has conductivity can be used. The artificial object according to an embodiment of the present invention can be associated with a capacitance distribution. The capacitance distribution can be obtained by converting each of capacitance data into an evaluation level in an evaluation system having more than two evaluation levels. The capacitance data being obtained by measuring with at least one electrodes in a sensor at least one predefined surfaces of the artificial object placed against the sensor.

At least one predefined surfaces of the artificial object or parts of the artificial object which is in proximity of the predefined surface of the artificial object are composed of the materials selected from a group including at least one metals, at least one conductive polymers, at least one conductive fillers, at least one conductive adhesives, at least one conductive coating materials, and a combination of these. A person having ordinary skill can use any metals, any conductive polymers, any conductive fillers, any conductive adhesives, or any conductive coating materials, which are known in the art.

At least one metals can be selected from a group including for example, but not limited to, silver, copper, gold, aluminum, molybdenum, zinc, lithium, tungsten, brass, carbon (exPAN), nickel, iron, palladium, platinum, tin, bronze 67Cu33Zn, carbon steel, lead, titanium, St. Steel 316L EN1.4404, St. Steel 304 EN1.4301, mercury, Fe. Cr. Alloy and St. Steel 310 EN1.4841.

At least one conductive polymer can be selected from a group including for example, but not limited to, conjugated conducting polymers, charge transfer polymers, ionically conducting polymers, and conductively filled polymers. At least one conductive filler can be selected from a group including for example, but not limited to, diamond, silver, aluminum nitride, β-boron nitride, and zinc oxide.

At least one conductive adhesive can be selected from a group including for example, but not limited to, copper conductive adhesives, silver conductive adhesives, and silicone conductive adhesive. At least one conductive coating material can be selected from a group including for example, but not limited to, conductive polymer.

An exemplified artificial object can be for example, but not limited to, a signet, a badge, a key, a writing utensil, a stylus pen, a card, a ring, a pendant, a pair of glasses, a watch, or a game piece. If the artificial object is a signet, the signet can have one face or a plurality of faces. If the signet has the plurality of faces, each face can have for example, but not limited to, different characters or figures. For example, the signet has faces of "approval", of "rejected" and "pending". Each face among the plurality of faces can be properly used as a user's intention.

The term, "a sensor" can refer to any sensor which can measure capacitance. The sensor can be capacitive sensors. The capacitive sensors can detect anything which is conductive or has a dielectric different from that of air. Many types of sensors known in the art can be used as a capacitive sensor.

In one aspect of the present invention, three types of capacitive sensing can be typically used: a surface capacitive type, a projected capacitive type and a mutual capacitive type. In the present invention, the projected capacitive type can be preferred. The projected capacitive sensor is well known in the art. When an artificial object which is a conductive object comes into contact with the projected capacitive touch panel, it distorts local electrostatic field at that point. This is measurable as a charge in capacitance.

In another aspect of the present invention, two types of capacitance sensor can be typically used in the 3D touch panel: a plane-type capacitance sensor and a parallel-type capacitance sensor. The parallel-type capacitance sensor can measure not only capacitance but also identify the material on contact.

The sensor can be implemented in a display, such as a touch panel in a sensor device as a peripheral device, or in a body of the device. The touch panel can be a 3D touch panel. The 3D touch panel is emerging along with a progress of a device technology, which can detect conductive objects or an artificial object according to an embodiment of the present invention and recognize it on the 3D touch panel as well as touch on the 3D touch panel. The sensor device can be a touch production, such as a touch pad, for example, a 3D touch pad or force touch pad. The body of the device means, for example, a sensor which can be embedded in a keyboard or in a display.

One aspect of the present invention is explained below with reference to the drawings. Throughout the drawings referred to below, the same reference numerals and signs denote the same targets unless specifically noted otherwise. Note that the embodiment of the present invention is an embodiment for explaining a preferred mode of the present invention and is not intended to limit the scope of the present invention to the scope explained in the embodiment.

With reference now to FIG. 1A, FIG. 1A illustrates an exemplified basic block diagram of a device used in one embodiment of the present invention. Device 101 can be, for example, but is not limited to, a desktop, a laptop, a notebook, an embedded computer, a thin client, a tablet, a mobile terminal, a bank AM, a ticket vending machine, a computer KIOSK, a cash register, a security system, a smartphone, a mobile phone, a game terminal or equipment, or an internet television. Device 101 can be a stand-alone computer or a client computer. Device 101 can include at least one CPUs 102 and main memory 103 connected to bus 104. CPU 102 can be preferably based on a 32-bit or 64-bit architecture. CPU 102 can be, for example, but is not limited to, the Power® series of International Business Machines Corporation; the Core i™ series, the Core 2™ series, the Atom™ series, the Xeon™ series, the Pentium® series, or the Celeron® series of Intel Corporation; or the Phenom™ series, the Athlon™ series, the Turion™ series, or Sempron™ of Advanced Micro Devices, Inc. or other CPUs used for a tablet, a mobile terminal, a bank AM, a ticket vending machine, a computer KIOSK, a cash register, a security system, a smartphone, a mobile phone, a game terminal or equipment, or an internet television.

Display 106, such as a liquid crystal display (LCD), can be connected to bus 104 via display controller 105. Display 106 can be used to display, for management of the computer(s), information on a computer connected to a network via a communication line and information on software running on the computer using an appropriate graphics interface. Display 106 can be a touch display which can measure capacitance.

Disk 108 such as a hard disk or a solid state drive, SSD, and drive 109 such as a CD, a DVD, or a Blu-ray disk drive can be connected to bus 104 via an SATA or IDE controller 107. Moreover, keyboard 111 and mouse 112 can be connected to bus 104 via keyboard-mouse controller 110 or USB bus. An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data is stored in disk 108 to be loadable to the main memory.

Drive 109 can be used to install a program, such as the computer program of one embodiment of the present invention, readable from a CD-ROM, a DVD-ROM, or a Blu-ray disk to disk 108 or to load any data readable from a CD-ROM, a DVD-ROM, or a blue-ray disk into main memory 103 or disk 108, if necessary.

Communication interface 114 can be based on, for example, but is not limited to, the Ethernet® protocol. Communication interface 114 can be connected to bus 104 via communication controller 113, physically connects device 101 to communication line 115, and can provide a network interface layer to the TCP/IP communication protocol of a communication function of the operating system of device 101. In this case, communication line 115 can be a wired LAN environment or a wireless LAN environment based on wireless LAN connectivity standards. Device 101 can be connected to a sensor device which can measure capacitance.

Figure 1B:
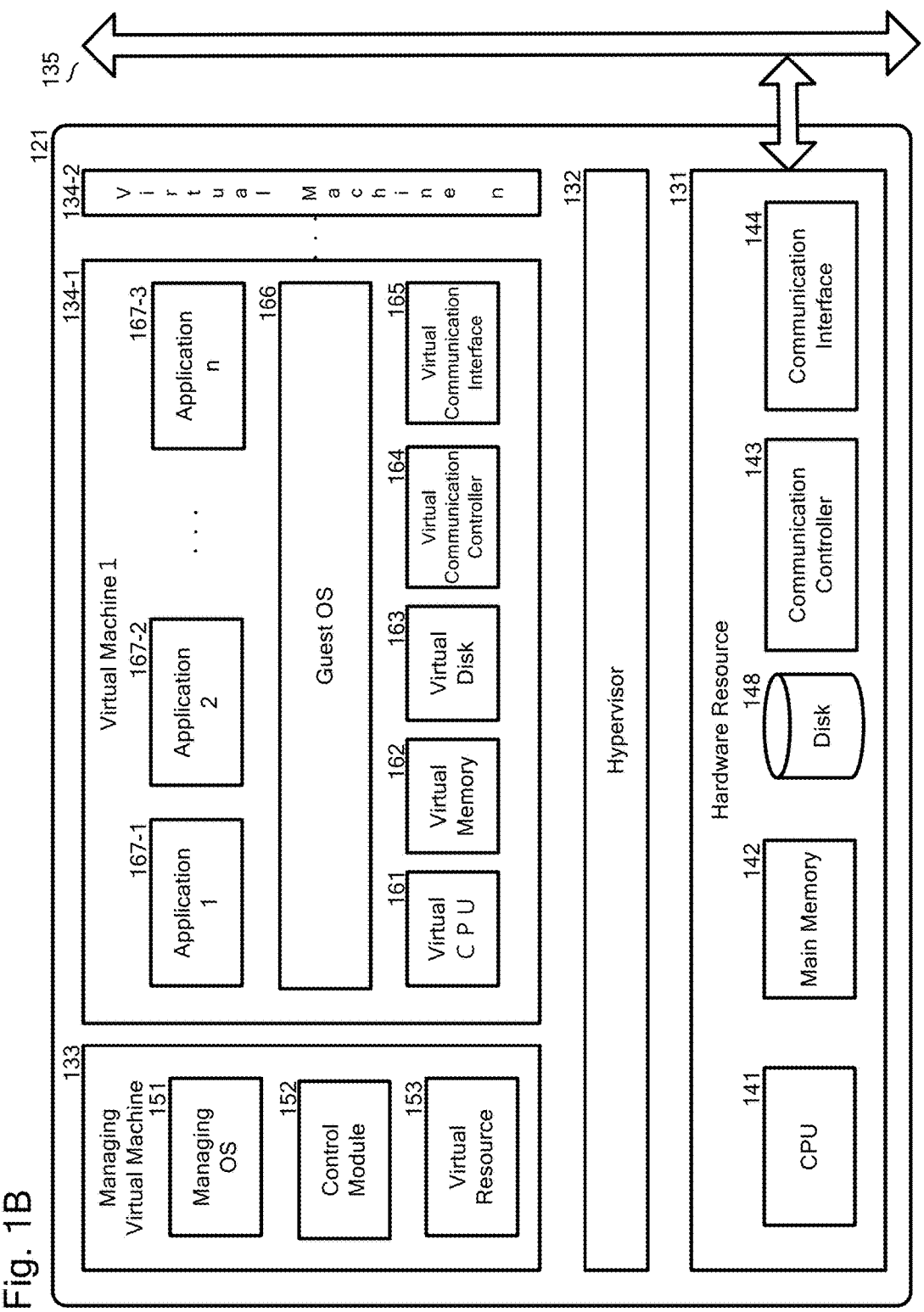
FIG. 1B illustrates an exemplified basic block diagram of a server computer used in an embodiment of the present invention.

With reference now to FIG. 1B, server computer 121 can be, for example, but is not limited to, a workstation, a rack-mount type server, a blade type server, or a mainframe server. Server computer 121 can run a virtual machine or cloud computing for performing embodiments of the present invention. Server computer 121 can include hardware resource 131, hypervisor 132, called a virtual machine monitor or a virtual operating system, managing virtual machine 133, called a domain-0 or a parent partition, and at least one virtual machines 1 to n (134-1 to 134-2), called a domain-U or a child partition.

Hardware resource 131 can include at least one CPUs 141, main memory 142, disk 148 such as a hard disk or a solid state drive, SSD, communication controller 143, and communication interface 144. CPU 141, main memory 142, disk 148, communication controller 143, and communication interface 144 can correspond to CPU 102, main memory 103, disk 108, communication controller 113, and communication interface 114 described in FIG. 1A, respectively.

Hypervisor 132 may, for example, be a part of a computer software, firmware or hardware which can create and run at least one virtual machines. Hypervisor can run directly on hardware resource 131. Hypervisor 132 can manage a guest operating system 166. Hypervisor 132 can be realized by, for example, but is not limited to, a virtual software.

Managing virtual machine 133 can include, for example, managing operating system 151, control module 152, and virtual resource 153. Control module 152 can run on managing operating system 151 and issue a command to hypervisor 132. Control module 152 can generate at least one virtual machine 1 to n (134-1, 134-2). Further, control module 152 can issue a boot command for guest operating system 156 and control an operation of virtual machine 1 to n (134-1 to 134-2). Virtual resource 153 can be hardware resource assigned to managing virtual machine 133.

Server computer 121 can implement at least one of the virtual machines 1 to n (134-1 to 134-2). Virtual machine 1 (134-1) can include a virtual resource, for example, but is not limited to, virtual CPU 161, virtual memory 162, virtual disk 163, virtual communication controller 164 and virtual communication interface 165. Further, Virtual machine 1 (134-1) can include, for example, but is not limited to, guest operating system 166 and at least one application(s) 1 to n (167-1 to 167-3).

Guest operating system 166, such as Windows®, UNIX® or Linux®, can run on virtual machine 1 (134-1). The same applies also to other virtual machines, such as virtual machine n (134-2). At least one application (167-1, 167-2, and 167-3) can run on guest operating system 166. The computer program of one aspect of the present invention can be implemented as one of the applications (167-1, 167-2, and 167-3).

In one aspect of the present invention, client device 101 can connect to the virtual machine implemented on server computer 121, via such as an internet or an intranet. FIGS. 2A and 2B, 3A and 3B, 4A to 4C illustrate flowcharts used in an embodiment of the present invention. FIGS. 2A and 2B illustrate embodiments of a flowchart of a process for registering a capacitance distribution and a pair of a capacitance distribution and imprint image data, respectively, prior to identification of an artificial object.

A computer used for registering the capacitance distribution or a pair of a capacitance distribution and imprint image data, such as device 101, server computer 121 or any other computer can perform the process described in FIGS. 2A and 2B. In the explanation of FIGS. 2A and 2B, the computer can have a touch display which can measure capacitance or be connected to a touch display which can measure capacitance.

Prior registering a capacitance distribution or a pair of a capacitance distribution and imprint image data, a user or an administrator can prepare or obtain an artificial object for registering the capacitance distribution as a pre-registered capacitance distribution or a pair of a capacitance distribution and imprint image data as a pre-registered pair of a capacitance distribution and imprint image data.

The user or administrator can purchase an artificial object according to an embodiment of the present invention. Otherwise, the user or administrator can make an artificial object according to an embodiment of the present invention. The artificial object according to an embodiment of the present invention can be explained in detail in FIGS. 6A and 6B mentioned below. Registration and identification of an artificial object sometimes accompanies with the user's intention, especially when an artificial object has a plurality of registrations, corresponding to "approve", "reject", and "pending", for example. In this case, an artificial object can have at least one registrations of capacitance distribution in association with the user's intention, and will be identified with the user's intention when there is a match of the capacitance distribution.

With reference now to FIG. 2A, FIG. 2A illustrates one embodiment of a flowchart of a process for registering a capacitance distribution on a surface of an artificial object into storage as a pre-registered capacitance distribution. In step 201, the computer starts the process mentioned above. In step 202, the computer detects an artificial object placed against a sensor, for example, in the touch display when the artificial object touches or is close to the touch display by the user or administrator.

In step 203, the sensor measures capacitances with at least one electrode in the sensor at least one predefined surfaces of the artificial object placed against the sensor. In one embodiment, the sensor can measure capacitances by using one electrode of the sensor and a point of the predefined surface of the artificial object. When the sensor has one electrode, the surface of the artificial object can be scanned using one electrode by moving the electrode or by moving the artificial object on the electrode. In another embodiment, the sensor can measure capacitances between each of the electrodes in the sensor and a point of the predefined surface of the artificial object. When the sensor does not enough electrodes, the surface of the artificial object can be scanned using the electrodes by moving the electrodes or by moving the artificial object on the electrodes. The predefined surface refers to an area which can be close to a surface of the sensor.

When the predefined surface of the artificial object is in contact with a surface of the sensor, the measured capacitances are capacitances measured at points which are in contact with the surface of the sensor, capacitances measured at points which are not in contact with the surface of the sensor, or a combination of these. When the predefined surface of the artificial object is not in contact with the surface of the sensor, the measured capacitances are capacitances at which capacitances can be measurable. The computer obtains raw data, that is, capacitance data of the artificial object.

In step 204, the computer converts each of the obtained capacitance data into an evaluation level in an evaluation system having more than two evaluation levels, to obtain a capacitance distribution on the surface of the artificial object. In one embodiment of the present invention, the evaluation levels are expressed in a manner of gray represented by multi-bits, that is, not a single-bit.

In step 206, the computer registers the obtained capacitance distribution into storage 281 as a pre-registered capacitance distribution. The user's intention can be associated with the capacitance distribution, and can be registered with the artificial object as a pair associated with the capacitance distribution, typically when the artificial object has a plurality of pre-registered capacitance distributions, for example, corresponding to "approve", "reject", and "pending". Storage 281 stores one capacitance distribution or a plurality of capacitance distributions for identification. In step 207, the computer terminates the process mentioned above. Each artificial object has a unique capacitance distribution. Accordingly, the pre-registered capacitance distribution can be used for identifying an artificial object, as seen in a flowchart described in FIG. 3A.

With reference now to FIG. 2B, FIG. 2B illustrates one embodiment of a flowchart of a process for registering a pair of a capacitance distribution on a surface of an artificial object and imprints image data into storage as a pre-registered pair of a capacitance distribution and imprint image data. In step 211, the computer starts the process mentioned above. Steps 212 and 213 correspond to steps 201 and 203 in FIG. 2A, respectively. Accordingly, the explanation of steps 201 and 203 is applied to steps 212 and 213, respectively. Step 214 corresponds to step 204 in FIG. 2A. Accordingly, the explanation of step 204 is applied to step 214.

In step 215, the computer obtains imprint image data for the surface of the artificial object, using the sensor which can be a parallel-type capacitance sensor used in a 3D touch panel. The imprint image data is an image data of area which is in contact with the surface of the sensor. In one embodiment, the imprint image data can be derived from the capacitance data.

In step 216, the computer registers a pair of the obtained capacitance distribution and the imprint image data into storage 291 as a pre-registered pair of the capacitance distribution and imprint image data. The user's intention can be registered with the artificial object as a pair associated with the capacitance distribution and the imprint image. Storage 291 stores one pair of the capacitance distribution and imprint image data or a plurality of pairs of them for identification. In step 217, the computer terminates the process mentioned above.

FIGS. 3A and 3B illustrate embodiments of a flowchart of a process for concluding whether the artificial object is identified or not. In the explanation of FIGS. 3A and 3B, in one embodiment, let us suppose that a subject of steps mentioned below is device 101. Further, in one embodiment, let us suppose that device 101 can have a touch display which can measure capacitance. It cannot be essential, but recommendable, that the sensor used in FIGS. 3A and 3B is the same or similar as that used in FIGS. 2A and 2B.

With reference now to FIG. 3A, FIG. 3A illustrates one embodiment of a flowchart of a process for determining whether an obtained capacitance distribution matches the pre-registered capacitance distribution or one of pre-registered capacitance distributions. In step 301, device 101 starts the process mentioned above.

In step 302, the computer detects an artificial object placed against a sensor, for example, in the touch display when the artificial object touches or is close to the touch display by the user. In step 303, the sensor measures capacitances with at least one electrode in the sensor at least one predefined surfaces of the artificial object placed against the sensor. In one embodiment, the sensor can measure capacitances by using one electrode in the sensor and a point of the predefined surface of the artificial object. When the sensor has one electrode, the surface of the artificial object can be scanned using one electrode by moving the electrode or by moving the artificial object on the electrode. In another embodiment, the sensor can measure capacitances between each of the electrodes in the sensor and a point of the predefined surface of the artificial object. When the sensor does not enough electrodes, the surface of the artificial object can be scanned using the electrodes by moving the electrodes or by moving the artificial object on the electrodes. The predefined surface refers to an area which is close to a surface of the sensor.

When the predefined surface of the artificial object is in contact with a surface of the sensor, the measured capacitances are capacitances measured at points which are in contact with the surface of the sensor, capacitances measured at points which are not in contact with the surface of the sensor, or a combination of these. When the predefined surface of the artificial object is not in contact with the surface of the sensor, the measured capacitances are capacitances at which capacitances can be measurable.

Device 101 obtains raw data, that is, raw capacitance data of the artificial object. In step 304, device 101 converts each of the obtained capacitance data into an evaluation level in an evaluation system having more than two evaluation levels, to obtain a capacitance distribution on the surface of the artificial object. Device 101 uses the same evaluation system as used in step 204 described in FIG. 2A. In one embodiment of the present invention, the evaluation levels are expressed in a manner of gray represented by multi-bits.

In one embodiment, in step 306, device 101 can obtain a pre-registered capacitance distribution from storage 281 and, then, determine whether the obtained capacitance distribution matches the pre-registered capacitance distribution. This is a case that, for example, there is one pre-registered capacitance distribution in storage 281. For example, when a user authentication is required in a user computer, one pre-registered capacitance distribution is enough to authenticate the user. In an embodiment, the determination can include determining whether the whole or parts of the obtained capacitance distribution matches the whole or parts of a pre-registered capacitance distribution. In another embodiment, the determination can include determining whether all or parts of feature points of the obtained capacitance distribution match all or parts of feature points of a pre-registered capacitance distribution.

In another embodiment, in step 306, device 101 can search for capacitance distribution which matches the obtained capacitance distribution, among a plurality of pre-registered capacitance distributions, and, then, determine whether the obtained capacitance distribution matches one of pre-registered capacitance distributions. This is a case that, for example, there is a plurality of pre-registered capacitance distributions in storage 281. For example, when a user authentication is required for using a shared computer or entering a secure area, a plurality of pre-registered capacitance distributions are necessary to authenticate each user. For example, when an identification of each game piece is necessary, such as chess, a game of Go (or Igo), a game of Shogi (or Japanese chess), or a game of Chinese chess, a plurality of pre-registered capacitance distributions are necessary to identify each game piece. In another embodiment, the determination can include determining whether the whole or parts of the obtained capacitance distribution matches the whole or parts of one of pre-registered capacitance distributions. In another embodiment, the determination can include determining whether all or parts of one of pre-registered capacitance distributions. When the user's intention is registered associated with the artificial object as the pair associated with capacitance distribution, the user's intention is also determined in addition to the artificial object. There are cases when a single artificial object is registered more than once associating with different user intentions. For example, an artificial object has three signet surfaces, representing "accept", "reject", and "pending". In this case, when identifying the capacitance distribution, the artificial object and the user intention associated with the surface are also determined.

In step 307, device 101 proceeds with step 307 if the determination result is positive. Meanwhile, the computer proceeds with step 309 if the determination result is not positive. In step 308, device 101 concludes that the artificial object is identified. Device 101 can show the result on the touch display that the artificial object is identified. If necessary, device 101 proceeds with a process described in FIG. 4A, 4B or 4C. In step 309, device 101 concludes that the artificial object is not identified. Device 101 can show the result on the touch display that the artificial object is not identified. In step 310, device 101 terminates the process mentioned above.

As described in the above explanation, a subject of the steps mentioned above is device 101. However, if device 101 is a client device or device 101 and can be connected to server computer 121, device 101 can perform steps 302 and 303 and server computer 121 can perform steps 304 to 309. In step 302, after obtaining of capacitance data of the artificial object, device 101 can send the capacitance data of the artificial object to server computer 121 and, then, server computer 121 can receive the capacitance data.

With reference now to FIG. 3B, FIG. 3B illustrates one embodiment of a flowchart of a process for determining whether a pair of an obtained capacitance distribution and imprint image data matches the pre-registered pair of a capacitance distribution or one of pairs of a pre-registered capacitance distribution and imprint image data. In step 311, device 101 starts the process mentioned above. Step 312 corresponds to step 302 in FIG. 3A. Accordingly, the explanation of step 302 is applied to step 312. Step 313 corresponds to step 303 in FIG. 3A. Accordingly, the explanation of step 303 is applied to step 313. Further, in step 313, device 101 can obtain a raw data, that is, raw data of imprint image data at the same time. Step 314 corresponds to step 304 in FIG. 3A. Accordingly, the explanation of step 304 is applied to step 314.

In step 315, device 101 identifies imprint image data for the surface of the artificial object, using the sensor which can be a parallel-type capacitance sensor used in a 3D touch panel. The imprint image data is an image data of area which is in contact with the surface of the sensor. In one embodiment, the imprint image data can be imprint image data for the face of the signet if at least one predefined surfaces of the artificial object are a face of a signet.

In one embodiment, in step 316, device 101 can obtain a pair of a pre-registered capacitance distribution and imprint image data from storage 291 and, then, determine whether the obtained pair of the capacitance distribution and imprint image data matches a pre-registered pair of the capacitance distribution and imprint image data. This is a case that, for example, there is one pre-registered pair of the capacitance distribution and imprint image data in storage 291. For example, when a user authentication is required in a user computer, one pre-registered pair of the capacitance distribution and imprint image data is enough to authenticate the user. In another embodiment, in step 316, device 101 can search for a pair of a capacitance distribution and imprint image data which matches the obtained pair of the capacitance distribution and image imprint data, among a plurality of pre-registered pairs of capacitance distributions and imprint image data from storage 291 and, then, determine whether the obtained pair of the capacitance distribution and imprint image data matches one of pre-registered pairs of the capacitance distributions and imprint image data. This is a case that, for example, there is a plurality of pre-registered pairs of the capacitance distributions and imprint image data in storage 291. For example, when a user authentication is required for using a shared computer or entering a secure area, a plurality of pre-registered pairs of the capacitance distributions and imprint image data are necessary to authenticate each user. For example, when an identification of each game piece is necessary, such as chess, a game of Go (or Igo), a game of Shogi (or Japanese chess), or a game of Chinese chess, a plurality of pre-registered pairs of the capacitance distributions and imprint image data are necessary to identify each game piece. In addition, when the user's intention is registered associated with the artificial object as the pair associated with the pair of the capacitance distribution and the imprint image, the user's intention is also determined.

Steps 317 to 319 correspond to steps 307 to 309 in FIG. 3A, respectively. Accordingly, the explanation of steps 307 to 309 is applied to steps 317 to 319, respectively. In step 320, device 101 terminates the process mentioned above. As described in the above explanation, a subject of steps mentioned above is device 101. However, if device 101 is a client device or device 101 and can be connected to server computer 121, device 101 can perform steps 312 and 313 and server computer 121 can perform steps 314 to 319. In step 312, after obtaining capacitance data of the artificial object, device 101 can send the capacitance data of the artificial object to server computer 121 and, then, server computer 121 can receive the capacitance data.

Figure 4A:
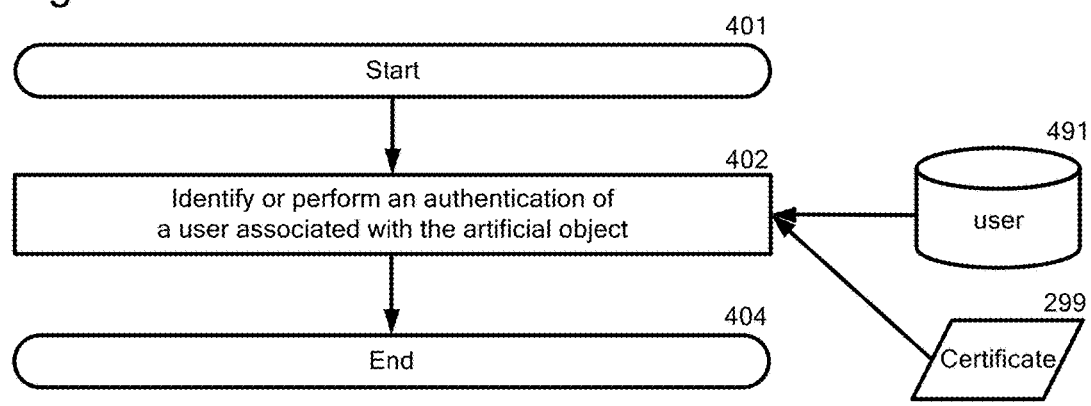
FIG. 4A illustrates one embodiment of a flowchart of a process for identifying or performing an authentication of a user associated with the artificial object.

FIGS. 4A to 4D illustrate embodiment of a flowchart of a process after concluding that the artificial object is identified. In the explanation of FIGS. 4A to 4D, in one embodiment, let us suppose that a subject of steps mentioned below is device 101. Further, in one embodiment, let us suppose that device 101 can have a touch display which can measure capacitance. With reference now to FIG. 4A, FIG. 4A illustrates one embodiment of a flowchart of a process for identifying or performing an authentication of a user associated with the artificial object. In step 401, device 101 starts the process mentioned above.

In one embodiment, in step 402, device 101 can identify a user associated with the artificial object, using a user database 491. User database 491 stores a pair of a capacitance distribution of an artificial object and a user associated with the capacitance distribution. After identification, device 101 can display information to the effect that a user is identified. In another embodiment, in step 402, device 101 can perform an authentication of a user, using a user database 491 and a certificate 299 derived from a trusted authority. In step 403, device 101 terminates the process mentioned above.

Figure 4B:
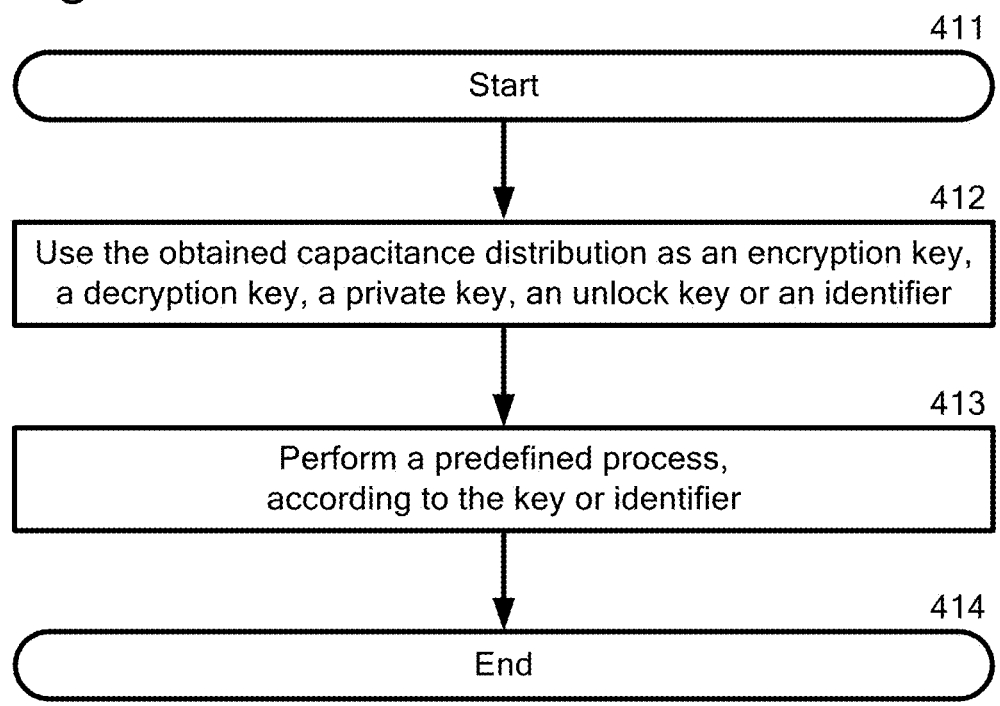
FIG. 4B illustrates one embodiment of a flowchart of a process for using the obtained capacitance distribution as a key or an identifier.

With reference now to FIG. 4B, FIG. 4B illustrates one embodiment of a flowchart of a process for using the obtained capacitance distribution as a key or an ID. In step 411, device 101 starts the process mentioned above. In step 412, device 101 can use the obtained capacitance distribution as an encryption key, a decryption key, a private key or an unlock key or an identifier, such as a user ID. The encryption key, the decryption key and the private key can be used, for example, for an encryption system. The unlock key can be used, for example, for a key for entering a secure area. The identifier can be used, for example, for accessing a server computer, or a specific URL or file.

In step 413, device 101 can perform a predefined process, according to the key mentioned above or identifier. If the obtained capacitance distribution is used as the encryption key, device 101 can encrypt a file or document, using the encryption key. If the obtained capacitance distribution is used as the decryption key, device 101 can decrypt an encrypted file or document, using the decryption key. If the obtained capacitance distribution is used as the private key, device 101 can encrypt a file or document or decrypt an encrypted file or document, using the decryption key. In step 414, device 101 terminates the process mentioned above.

With reference now to FIG. 4C, FIG. 4C illustrates one embodiment of a flowchart of a process for using the obtained capacitance distribution as a seed for generating a key or an ID.

In step 421, device 101 starts the process mentioned above. In step 422, device 101 can use the obtained capacitance distribution as a seed for generating an encryption key, a decryption key, a private key or an unlock key, or a user ID to generate a key or an identifier. The person skilled in the art can generate the key or identifier on the basis of the capacitance distribution, according to a known art. In step 423, device 101 can perform a predefined process, according to the generated key mentioned above or identifier, in a similar manner described in step 413 in Figure B. In step 424, device 101 terminates the process mentioned above.

Figure 4D:
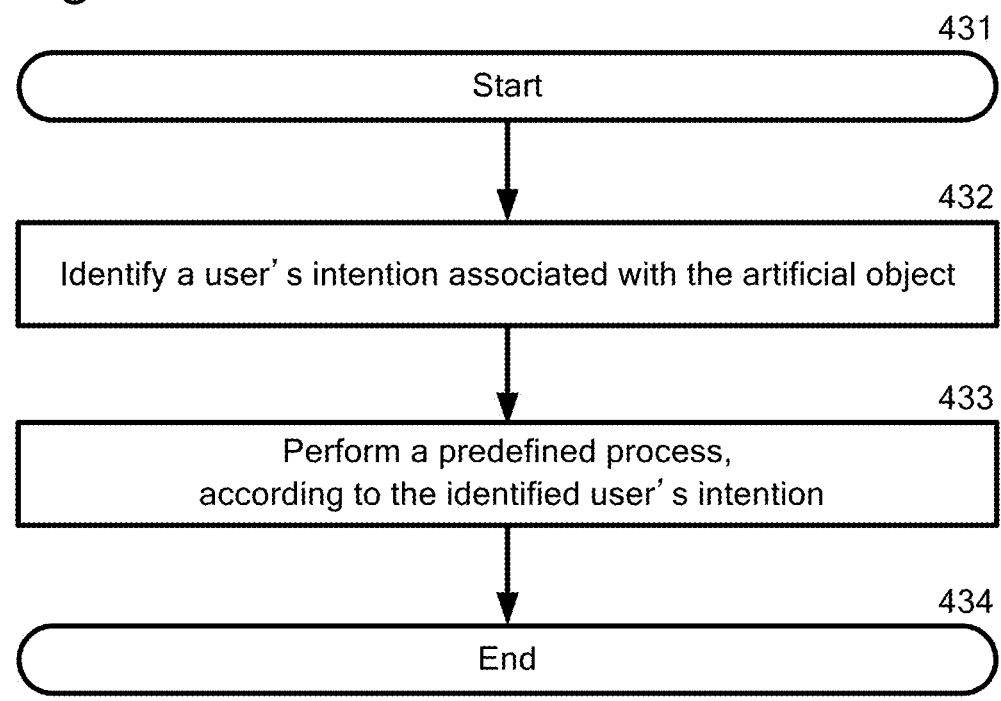
FIG. 4D illustrates one embodiment of a flowchart of a process for identify a user's intention associated with the artificial object.

With reference now to FIG. 4D, FIG. 4D illustrates one embodiment of a flowchart of a process for a process for identify a user's intention associated with the artificial object. In step 431, device 101 starts the process mentioned above. In step 432, device 101 can identify a user's intention associated with the artificial object based on the measured capacitance distribution. The user's intention can be for example, but not limited to, "approval", "rejected" or "pending". The artificial object can have a plurality of surfaces in which imprint pattern of the character of "approval", "rejected", "pending", or their relating terms is sculptured. In step 433, device 101 can perform a predefined process, according to the identified user's intention. In step 434, device 101 terminates the process mentioned above.

With reference now to FIG. 5A, FIG. 5A illustrates embodiments of detection of an artificial object on a sensor. An embodiment 501 described in the upper part in FIG. 5A shows that a given surface of an artificial object 511 is in contact with the surface of a sensor 541 which can measure capacitance.

The artificial object 511 has several surfaces (521, 522 and 523) which can be in contact with the surface of sensor 541 and several surfaces or recesses (531, 532, 533, 534 and 535) which cannot be in contact with the surface of sensor 541. The surfaces (521, 522 and 523; 531, 532, 533, 534 and 535) has conductivity and they are in various proximity positions from the surface of sensor 541. Sensor 541 has (a) silicon substrate, (b) active circuits, (c) electrodes, and (d) protective layer. The surface of sensor 541 can refer to the protective layer.

When surfaces 521, 522 and 523 of artificial object 511 are in contact with a surface of sensor 541, sensor 541 can measure capacitances between each of the electrodes in sensor 541 and a point of surface 521, 522 and 523; 531, 532, 533, 534 and 535 of artificial object 511, the point facing each of the electrodes in sensor 541. The measured capacitances are capacitances measured at points 521, 522 and 523 which are in contact with the surface of sensor 541, capacitances measured at points 531, 532, 533, 534 and 535 which are not in contact with the surface of sensor 541, or a combination of these. In the embodiment 501 described in the upper part, capacitances are illustrated as ellipse for easiness of understanding.

Embodiment 502 described in the lower part in FIG. 5A shows that a given surface of an artificial object 551 is not in contact with the surface of a sensor 581 and artificial object 551 is close enough 582 to the surface such that sensor 581 can measure capacitance of artificial object 551. Artificial object 551 is the same as that 511 described in the embodiment 501 described in the upper part. Sensor 581 is the same as sensor 541 described in the embodiment 501 described in the upper part. When artificial object 551 is not in contact with the surface of sensor 581 and the distance between them 582 is close enough, sensor 581 can measure capacitances between each of the electrodes in sensor 581 and a point of surface 561, 562 and 563; 571, 572, 573, 574 and 575 of artificial object 551, the point facing each of the electrodes in sensor 581. Accordingly, the measurement capacitances are relative values of capacitances measured when artificial object 551 is not in contact with surface 561, 562 and 563; 571, 572, 573, 574 and 575 of sensor 581.

Figure 5B:
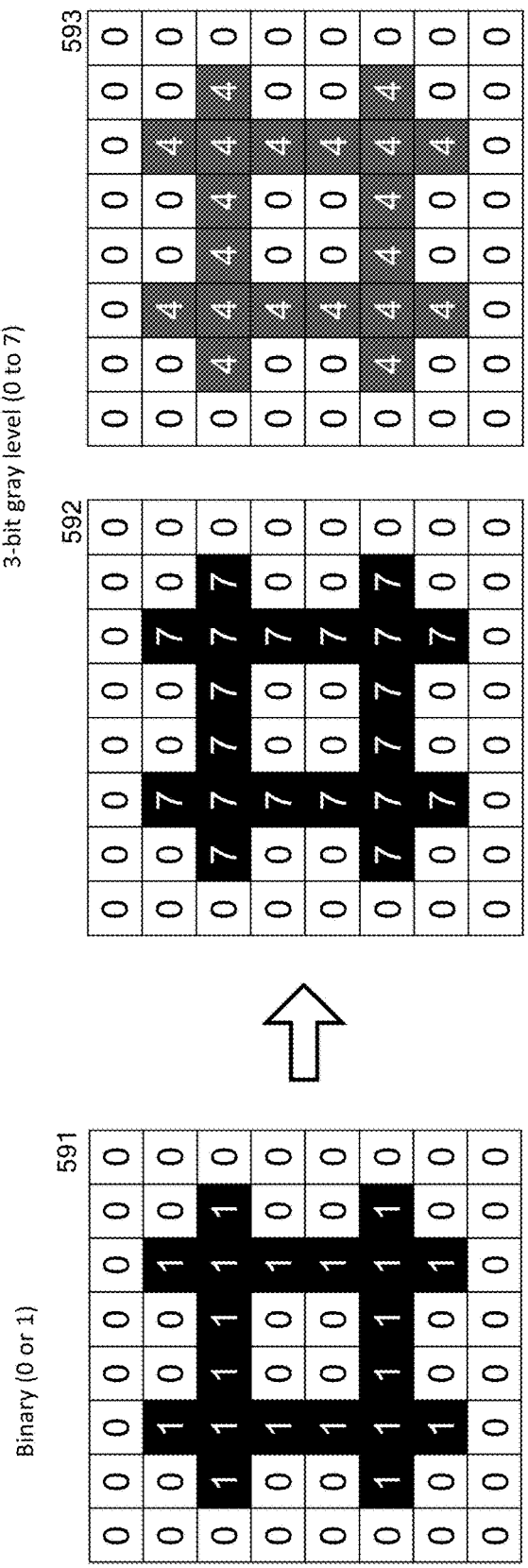
FIG. 5B illustrates embodiments of a capacitance distribution.

With reference now to FIG. 5B, FIG. 5B illustrates embodiments of a capacitance distribution. Capacitance distribution 591 is obtained by a conventional single-bit threshold manner. Capacitance distributions 592 and 593 are obtained by an embodiment of the present invention using multiple level evaluations. Capacitance distribution 591 shows a capacitance distribution by converting each of the obtained capacitance data into single-bit threshold, that is, binary: 0 or 1.

Capacitance distributions 592 and 593 show a capacitance distribution by converting each of the obtained capacitance data into a 3-bit gray level, that is, 0 to 7. In 3-bit gray level, levels 0 to 3 in 3-bit gray level correspond to 0 in binary and levels 4 to 7 in 3-bit gray level correspond to 1 in binary. When there are two artificial objects, one capacitance value is 7 592 and the other is 4 593, these capacitance distributions (592 and 593) are identified differently, whereas in the conventional way, both of them can be identical as measured like 591.

Figure 6A:
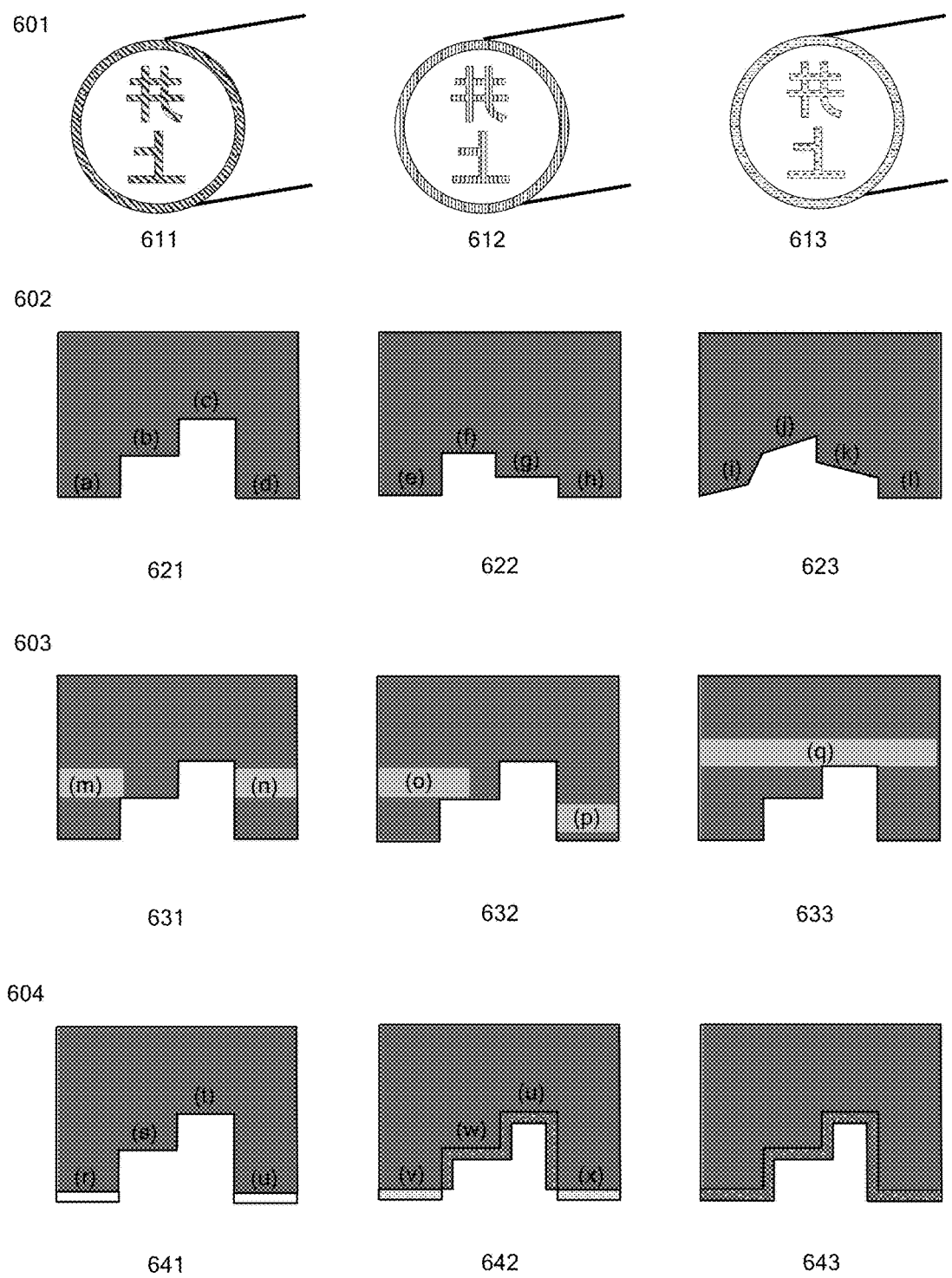
FIG. 6A illustrates embodiments of a variety of artificial objects.

With reference now to FIGS. 6A and 6B, FIGS. 6A and 6B illustrate embodiments of artificial objects. The present invention enhances the security features of a signet by introducing patterns of recess depths, materials, and hollows, in addition to the conventional imprint image as shown below. It increases difficulties to forge a signet, because copying capacitance distribution is still difficult, although copying the imprint image is easier with an emerging 3D printing technology today.

Each of the artificial objects has a variety of conductivities or dielectric constants, as mentioned below. A first aspect of embodiment 601 shows that an artificial object is a signet. Let us suppose that each of signets 611, 612 and 613 is composed of at least one kinds of materials which can be selected from a group including at least one metals, at least one conductive polymers, at least one conductive fillers, at least one conductive adhesives, at least one conductive coating materials, and combination of these. However, the kind of material among signets 611, 612 and 613 is different from each other, especially in view point of conductivity and/or dielectric constant. Accordingly, the obtained capacitance distribution on a face of each of signets 611, 612 and 613 is unique to each of signets 611, 612 and 613.

A second aspect of embodiments 602 shows that an artificial object has at least one recess with different depths. The recesses were made when a face of artificial object, such as a signet, was made. Let us suppose that each of artificial objects 621, 622 and 623 is composed of the same material having the same conductivity. However, the shape of the recesses ((b) and (c) in 621; (f) and (g) in 622; and ((j) and (k) in 623) in each of artificial objects 621, 622 and 623 is different from each other. The surface can be different in terms of depth and/or pattern of recesses. Accordingly, the obtained capacitance distribution on a face of each of artificial objects 621, 622 and 623 is unique to each of artificial objects 621, 622 and 623. In artificial object 623, the surface of artificial object 623 has a plurality of recesses ((i), (j) and (k)) and a side wall or bottoms of the recess ((i), (j) and (k)) is oblique to a surface (i) other than the surface of the recess ((i), (j) and (k)).

A third aspect of embodiments 603 shows that an artificial object is composed of plurality of materials in different conductivity and/or dielectric constant. Let us suppose that each of artificial objects 631, 632 and 633 has the same shape of the recesses. Artificial object 631 has different materials at a proximity position, shown in numerals (m) and (n), of the surface of artificial object 631. The materials shown by numerals (m) and (n) can be the same or different from each other. Similarly, artificial object 632 has different materials at a proximity position, shown in numerals (o) and (p), of the surface of artificial object 632. The materials shown by numerals (o) and (p) can be the same or different from each other. Similarly, artificial object 633 has different materials at a proximity position, shown in numeral (q), of the surface of artificial object 633. Accordingly, the obtained capacitance distribution on a face of each of artificial objects 631, 632 and 633 is unique to each of artificial objects 631, 632 and 633. As shown above, it can be allowed that parts of the artificial object which is in proximity of the surface are composed of at least one material having different electric conductivities or dielectric constants. The proximity position of the surface of the artificial object which can be composed of the materials selected from a group including at least one metals, at least one conductive polymer, at least one conductive filler, at least one conductive adhesive, at least one conductive coating materials, and combination of these.

A fourth aspect of the embodiments 604 shows that at least one surfaces of the artificial object are covered with at least one conductive polymers or painted with at least one conductive coating materials. Let us suppose that each body of artificial objects 641, 642 and 643 has the same shape including the recesses and is composed of the same material having the same conductivity. However, the surface of each of artificial objects 641, 642 and 643 is covered with at least one conductive polymer in a different manner or painted with at least one conductive coating material in a different manner. In artificial object 641, only surfaces ((r) and (u)) which can be in contact with the surface of the sensor are covered with conductive polymer or painted with conductive coating material, and, therefore, surfaces ((s) and (t)) which cannot be in contact with the surface of the sensor are not covered with conductive polymer nor painted with conductive coating material. In artificial object (642), surfaces ((v) and (x)) which can be in contact with the surface of the sensor are covered with conducive polymer or painted with conductive coating material, and surfaces ((w) and (u)) and side walls of the recesses ((w) and (u)) are also covered with conductive polymer which is different with the conductive polymer on the surface ((v) and (x)). In a variant embodiment of artificial object 642, surfaces ((w) and (u)) and side walls of the recesses ((w) and (u)) only being covered with conductive polymer is considered. In artificial object 643, all surfaces are covered with one conductive polymer or painted with one conductive coating material. Accordingly, the obtained capacitance distribution on a face of each of artificial objects 641, 642 and 643 is unique to each of artificial objects 641, 642 and 643. A person skilled in the art can know or easily understand how to cover or paint the surface of the artificial object, as seen in artificial objects 641, 642 and 643. As shown in above, the surface of the artificial object can be composed of at least one material having different electric conductivities or dielectric constants. The surface of the artificial object can be composed of the materials selected from a group including at least one metals, at least one conductive polymers, at least one conductive fillers, at least one conductive adhesives, at least one conductive coating materials, and combination of these.

A fifth aspect of the embodiments 605 shows that artificial object has at least one hollows in a variable proximity position of the surface. Let us suppose that each of artificial objects 651, 652 and 653 has the same shape including the recesses and is composed of the same material having the same conductivity. However, the number of hollows and location of the hollows of artificial objects 651, 652 and 653 are different with each other. Accordingly, the obtained capacitance distribution on a face of each of artificial objects 651, 652 and 653 is unique to each of artificial objects 651, 652 and 653.

A sixth aspect of the embodiment 606 shows that bodies 661 which are composed of the same or different materials (x and y) are adhered to each other with at least one conductive adhesives (z). The bodies 661 can be composed of the materials (x and y) having different conductivity and/or dielectric constant or non-conductivity or non-dielectric constant. The conductive adhesives includes, for example, silver, copper or graphite as a conductive component and a varnish or a synthetic resin as a sticky component.

A seventh aspect of the embodiment 607 shows that a plurality of materials are disposed, on a surface of the artificial object, alternately, or in a random, gradient, or grid manner. Let us suppose that each of artificial objects 671 to 675 is a card, such as a bank or credit card, an entrance key card, an employ ID card, a travel card, a shopping card, or a medical information card. In a card 671, different materials having different electric conductivities are alternatively vertically painted on the card. In card 672, different materials having different electric conductivities are alternatively horizontally painted on the card. In card 673, different materials having different electric conductivities are alternatively diagonally painted on the card. In card 674, different materials having different electric conductivities are painted in a gradient manner. In a card 675, different materials having different electric conductivities are painted in a grid manner. Accordingly, the obtained capacitance distribution on a face of each of cards 671 to 675 is unique to each of cards 671 to 675. The materials can be selected from a group including at least one metal, at least one conductive polymer, at least one conductive filler, at least one conductive adhesive, at least one conductive coating material, and combination of these. In the seventh aspect of the embodiment 607, when a plurality of materials are disposed alternately, a width between the stripes is the same or different on a card.

In view of cost, the fourth aspect of the embodiments 604 is most cost effective, because artificial objects available in a market, such as signet, can be used after covered with at least one conductive polymer or painted with at least one conductive coating material, as artificial objects according to an embodiment of the present invention.

As explained in the first to seventh aspects above, capacitance distributions can vary, depending on not only materials used in an artificial object or but also shape or geometry of the artificial object. Accordingly, when various materials in different materials having different conductivity and/or dielectric constants are used in the artificial object or when various shape or geometry are made, it allows to make substantially non duplicable artificial objects.

Figure 7B:
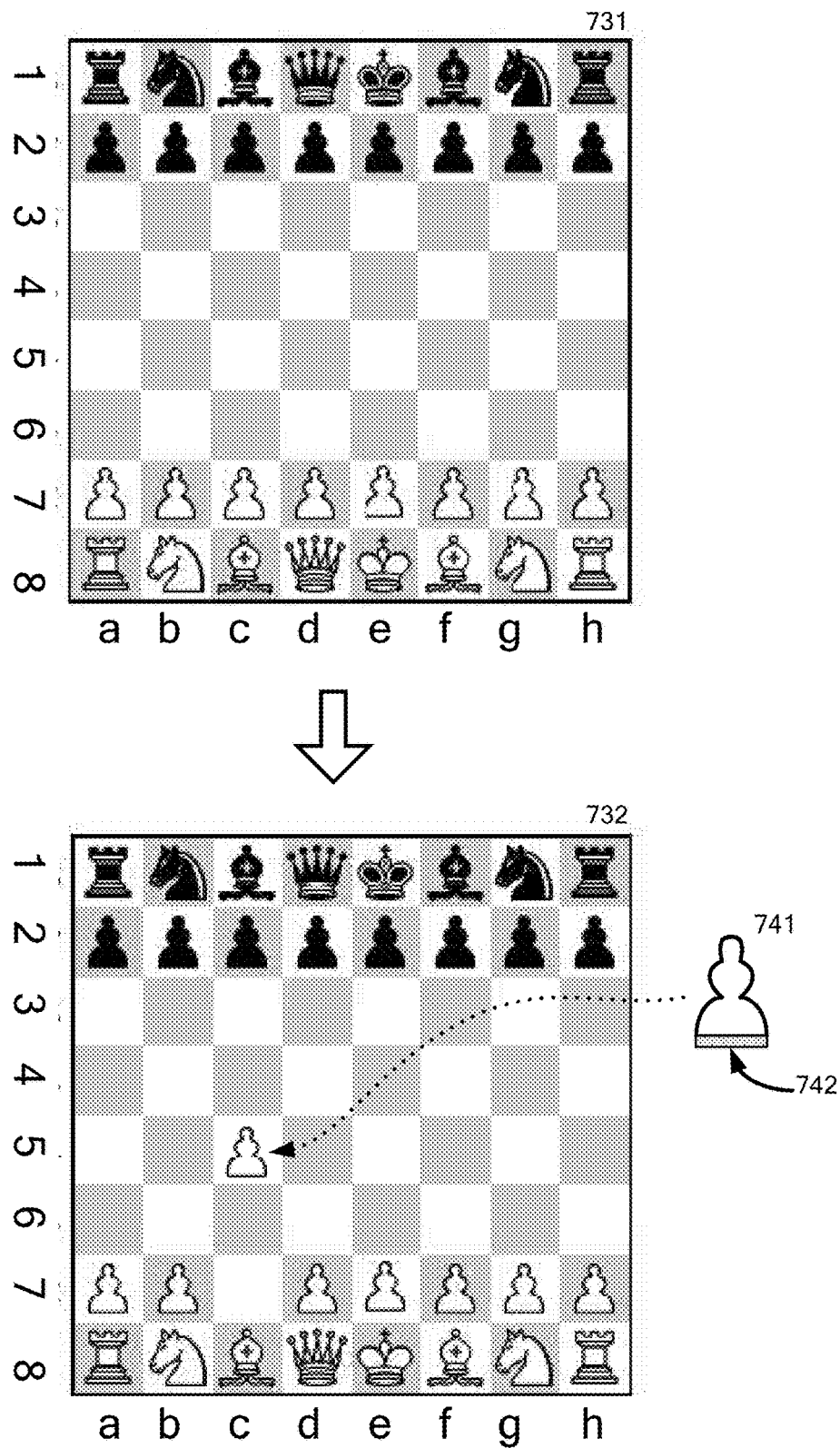
FIG. 7B illustrates embodiments of artificial objects being game pieces.

FIGS. 7A and 7B illustrate embodiments used in accordance with an embodiment of the present invention after concluding that the artificial object is identified. With reference now to FIG. 7A, FIG. 7A illustrates embodiments of a variety of user interfaces used in accordance with an embodiment of the present invention. User interface 701 will be shown on a touch display, for example, when a user tries to use a shared computer. User interface 701 shows that "Please press your signet on here to confirm your authentication". When the user touches display with his signet according to an embodiment of the present invention, the processes described in FIG. 3A or 3B will be performed. After concluding that the artificial object is identified, the user can use the shared computer. This means that a user of the signet is authenticated.

User interface 711 will be shown on a display, for example, when a user tries to enter a security room. User interface 711 shows that "Please touch your card key on the card reader to enter the security area". When the user touches display with his security card according to an embodiment of the present invention, the processes described in FIG. 3A will be performed. After concluding that the artificial object is identified, the user can enter the security area. This means that a user of the card is authenticated.

User interface 721 will be shown on a display, for example, when a user seals an electrical document for approval. When the user touches area 722 with his signet according to an embodiment of the present invention, the processes described in FIG. 3A or 3B will be performed. After concluding that the artificial object is identified, the imprint image of his signet is appeared in the area 722. This means that the signet is authenticated. An approval circulation can be achieved by putting multiple authenticated signets 722 and 723.

With reference now to FIG. 7B, FIG. 7B illustrates embodiments of artificial objects being game pieces. The touch display 731 on a game terminal shows a chess board. Each of the chess pieces is a real chess piece, that is, an artificial object. Each of the chess pieces is associated with a unique capacitance distribution. A capacitance distribution for each of the chess piece is obtained by converting each of capacitance data measured, using a sensor, between each of electrodes in the sensor and a point of bottom of the chess piece.

When a Pawn piece at a position of c-7 in 731 is moved to a position of c-5 in 732, a sensor in the touch display 731 and now 732 measures capacitances between each of the electrodes in the sensor and a point of the bottom 742 of the Pawn piece 741 while a player has the piece on his hand. The game terminal converts each of the obtained capacitance data into an evaluation level in an evaluation system having more than two evaluation levels, to obtain a capacitance distribution on the bottom 742 of the Pawn piece 741. The game terminal searches for capacitance distribution which matches the obtained capacitance distribution, among a plurality of pre-registered capacitance distributions which were obtained from each of the chess pieces, and, then, determines whether the obtained capacitance distribution matches one of pre-registered capacitance distributions. If the determination result is positive, the game terminal concludes that the Pawn piece 741 is identified. The game terminal records the movement of the Pawn piece 741 into storage. If the determination result is not positive, the game terminal concludes that the Pawn piece 741 is missing and not identified and can issue an alert that the Pawn piece 741 is not identified. In this way, the movements of the chess pieces are automatically recorded in storage of the game terminal. In the embodiment of FIG. 7B, it is said that each capacitance distribution of the chess piece is uses as an ID object.

Figure 8:
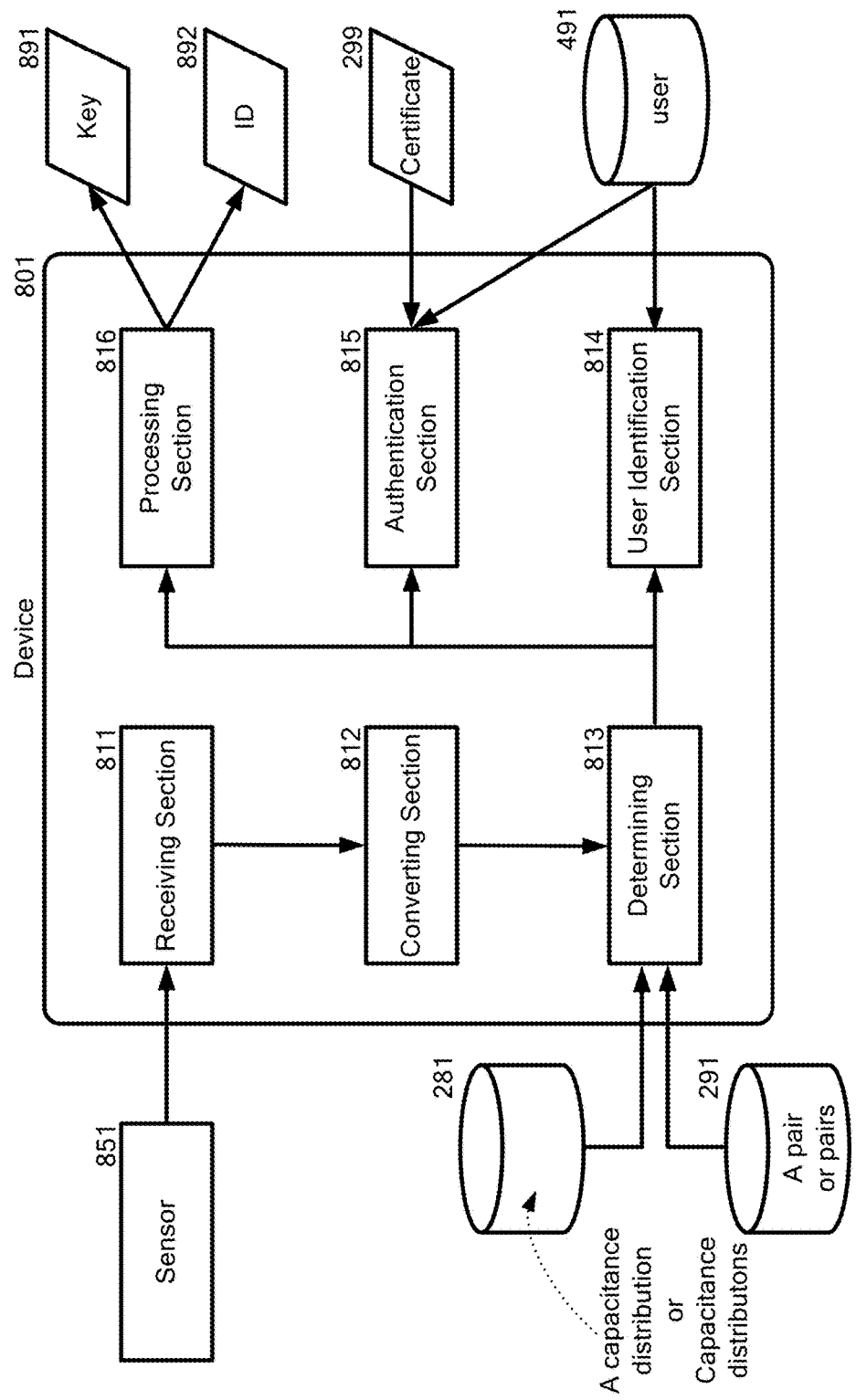
FIG. 8 illustrates one embodiment of an overall functional block diagram of a sensor and the device.
Figure 9:
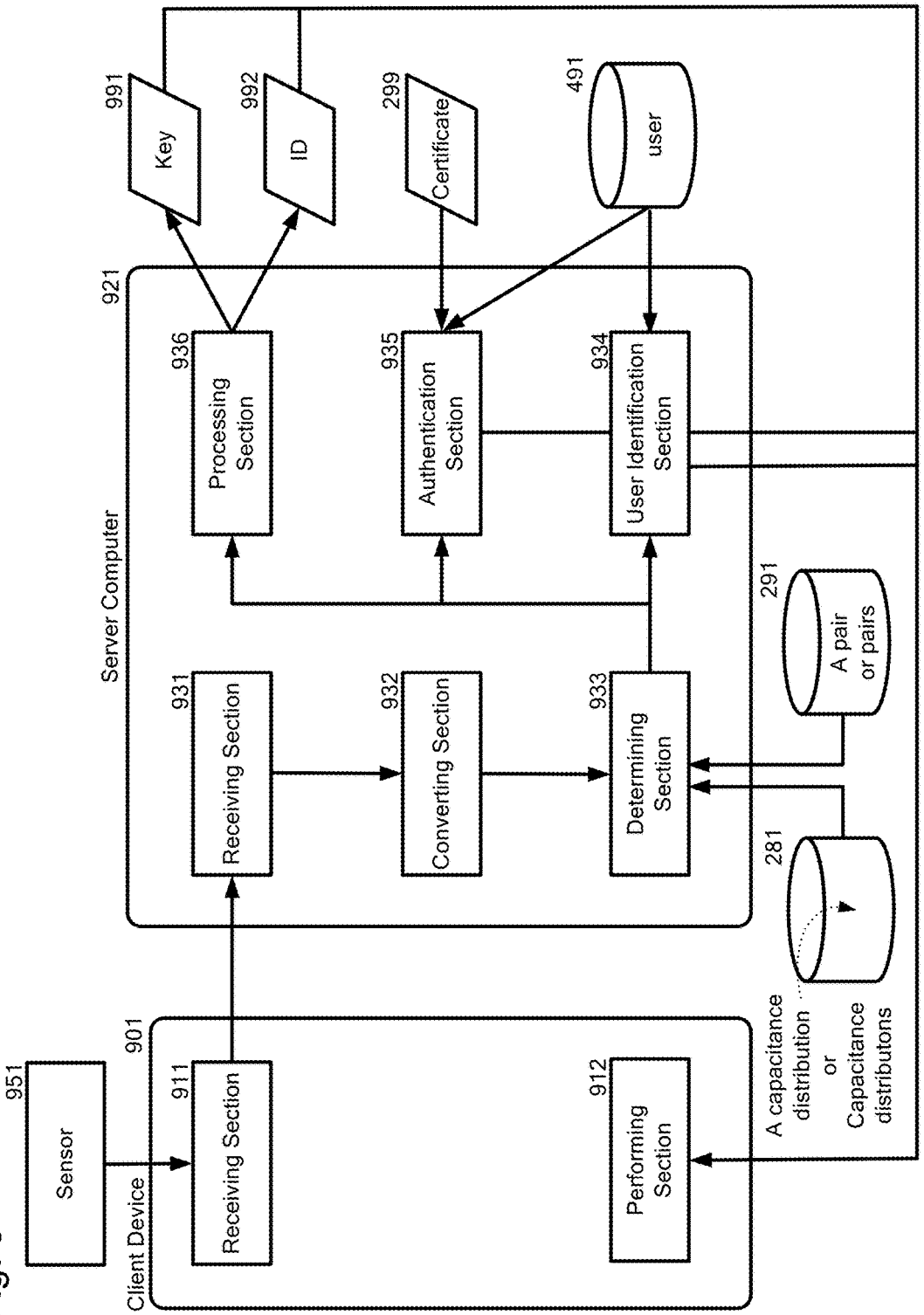
FIG. 9 illustrates one embodiment of an overall functional block diagram of a sensor, the device and the server computer.

FIGS. 8 and 9 illustrate embodiment of an overall functional block diagram of a sensor and a device, or a sensor, a device and a server computer. With reference now to FIG. 8, FIG. 8 illustrates one embodiment of an overall functional block diagram of a sensor 851 and a device 801. In the embodiment illustrated in FIG. 8, device 801 concludes that the artificial object is identified.

Device 801 can correspond to device 101 described in FIG. 1A. Device (821) can be connected to sensor 851. Sensor 851 can measure capacitances with at least one electrodes in the sensor at least one predefined surfaces of the artificial object placed against the sensor.

Device 801 includes a receiving section 811, a converting section 812 and a determining section 813. Device 801 can include at least one of a user identification section 814, an authentication section 815 and a processing section 816.

Receiving section 811 can receive capacitance data which is obtained by measuring with at least one electrodes in sensor 851 at least one predefined surfaces of the artificial object placed against sensor 851. Further, receiving section 811 can receive imprint image data which is obtained by measuring the same part of the artificial object and identify imprint image data for the face of a signet, if the artificial object is the signet. Receiving section 811 can perform step 303 described in FIG. 3A and step 313 described in FIG. 3B.

Converting section 812 can convert each of the obtained capacitance data into an evaluation level in an evaluation system having more than two evaluation levels, to obtain a capacitance distribution on the surface of the artificial object. Converting section 812 can perform step 304 described in FIG. 3A and step 314 described in FIG. 3B.

Determining section 813 can determine whether the obtained capacitance distribution matches a pre-registered capacitance distribution 281. Further, determining section 813 can determine whether the obtained capacitance distribution matches one of pre-registered capacitance distributions 281. Determining section 813 can conclude that the artificial object is identified if the determination result is positive. Determining section 813 can also determine whether a pair of the obtained capacitance distribution and imprint image data matches a pair of a pre-registered capacitance distribution and imprint image data, if the artificial object is the signet. Further, determining section 813 can also determine whether the obtained capacitance distribution matches one of pairs of a pre-registered capacitance distribution and imprint image data, if the artificial object is the signet.

Determining section 813 can also determine whether the whole or parts of the obtained capacitance distribution matches the whole or parts of a pre-registered capacitance distribution. Determining section 813 can also determine whether the whole or parts of the obtained capacitance distribution matches the whole or parts of one of pre-registered capacitance distributions.

Determining section 813 can also determine whether all or parts of feature points of the obtained capacitance distribution match all or parts of feature points of a pre-registered capacitance distribution. Determining section 813 can also determine whether all or parts of feature points of the obtained capacitance distribution match all or parts of one of pre-registered capacitance distributions.

Determining section 813 can conclude that the artificial object is identified if the determination result is positive, and the artificial object is not identified if the determination result is not positive. Determining section 813 can perform steps 306 to 309 described in FIG. 3A and steps 316 to 319 described in FIG. 3B.

User identification section 814 can identify, using user database 491, a user associated with the artificial object when the artificial object is identified. User identification section 814 can perform a process a user identification of step 402 described in FIG. 4A.

Authentication section 815 can perform, using a user database 491 and a certificate 299 derived from a trusted authority, an authentication of a user associated with the artificial object when the artificial object is identified. Authentication section 815 can perform an authentication of a user associated with the artificial object of step 402 described in FIG. 4A.

The processing section 816 can use the obtained capacitance distribution as a key 891 such as an encryption key, a decryption key, a private key, an unlock key or an identifier 892 such as a user identifier or an artificial object identifier. Further, the processing section 816 can use the obtained capacitance distribution as a seed for generating a key 891 such as an encryption key, a decryption key, a private key, an unlock key or an identifier 892 such as a user identifier or an artificial object identifier. Further, the processing section 816 can perform a predefined process, according to key 891 or identifier 892 mentioned above.

The processing section 816 can use the obtained capacitance distribution as a seed for generating an encryption key, a decryption key, a private key or an unlock key, or a user ID to generate a key or an identifier. Further, the processing section 816 can perform a predefined process, according to the generated key mentioned above or identifier.

The processing section 816 can identify a user's intention associated with the artificial object when the artificial object is identified. Further, the processing section 816 can perform a predefined process, according to the identified user's intention.

The processing section 816 can perform steps 412 and 413 described in FIG. 4B, steps 422 and 423 described in FIG. 4C, and steps 432 and 433 described in FIG. 4D. With reference now to FIG. 9, FIG. 9 illustrates one embodiment of an overall functional block diagram of a sensor 951, a client device 901 and a server computer 921.

In the embodiment illustrated in FIG. 9, server computer 921 concludes that the artificial object is identified. Client device 901 can correspond to device 101 described in FIG. 1A. Device 901 can be connected to a sensor 951. Client device 901 can connect server computer 921 through an intranet or an internet.

Sensor 951 can measure capacitances with at least one electrodes in the sensor at least one predefined surfaces of the artificial object placed against the sensor. Client device 901 includes a receiving section 911 and a performing section 912. Receiving section 911 can obtain capacitance data measured, using sensor 851 and, then send the obtained capacitance data to server computer 911.

Performing section 912 can receive key 991 or identifier 992 mentioned above and, then, perform a predefined process, according to key 991 or identifier 992 mentioned above. Server computer 921 can correspond to server computer 121 described in FIG. 1B. Server computer 921 includes a receiving section 931, a converting section 932 and a determining section 933. Server computer 921 can include at least one of a user identification section 934, an authentication section 935 and a processing section 936.

Receiving section 931, converting section 932 and determining section 933, user identification section 934, authentication section 935 and the processing section 936 correspond to receiving section 811, converting section 812 and determining section 813, user identification section 814, authentication section 815 and the processing section 816, respectively. Accordingly, the explanation of each section 811, 812, 813, 814, 815 and 816 described in FIG. 8 is applied to each section 911, 912, 913, 914, 915 and 916.

Further, receiving section 931 can receive the capacitance data from receiving section 911. Further, user identification section 934 can send client device 901 the result that a user associated with the artificial object is identified or a user associated with the artificial object is not identified. Further, authentication section 935 can send client device 901 the result that a user associated with the artificial object is authenticated or a user associated with the artificial object is not authenticated. Further, authentication section 935 can send client device 901 key 991 such as an encryption key, a decryption key, a private key, an unlock key or an identifier 992 such as a user identifier or an artificial object identifier.

The present invention can be a method, a system, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of at least one programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

According to one aspect of the present invention, a cheaper artificial object according to an embodiment of the invention, which can be used as usual signets for documents, can be provided. Further, according to an embodiment of the present invention, it can be difficult to duplicate an artificial object. Further, according to an embodiment of the present invention, a more secure electrical seal system can be provided.

Those skilled in the art can easily assume various changes such as combining hardware components of the computer used in one embodiment of the present invention with a plurality of machines and distributing functions to the machines and implementing the functions. Those changes are concepts naturally included in the idea of the present invention. However, these constituent elements are illustrations and not all the constituent elements are essential constituent elements of the present invention.

The present invention can be realized as hardware, software, or a combination of the hardware and the software. Typical examples of execution by the combination of the hardware and the software include execution of the computer program in a computer installed with the computer program. In such a case, the computer program is loaded to a memory of the computer and executed, whereby the computer program controls the computer to execute processing according to the present invention. The computer program can be configured from a command group that can be expressed by any language, code, or notation. Such a command group enables the computer to execute a specific function directly or after one or both of (a) conversion into another language, code, or notation and (b) copying to another media are performed.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes at least one executable instruction for implementing the specified logical function(s). In some alternative implementations, the functions noted in the block can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for identifying an artificial object that has conductivity, the method comprising:
receiving raw capacitance data of the artificial object which is obtained by measuring at least one electrode in a sensor at least one predefined surfaces of the artificial object placed against the sensor;
converting each of the obtained capacitance data into an evaluation level in an evaluation system having at least two evaluation levels, to obtain a capacitance distribution on the surface of the artificial object;
determining whether the obtained capacitance distribution matches a pre-registered capacitance distribution or one of pre-registered capacitance distributions; and
concluding that the artificial object is identified if the determination result is positive or the artificial object is not identified if the determination result is not positive
wherein the at least one predefined surfaces of the artificial object are composed of materials selected from a group including at least one metal, at least one conductive polymers, at least one conductive fillers, at least one conductive adhesives, at least one conductive coating materials, and/or a combination of the group.

2. The method according to claim 1, wherein the predefined surface of the artificial object is a face of a signet, and the method further comprising:
receiving imprint image data which is obtained by measuring the same part of the artificial object;
identifying imprint image data for the face of the signet, using the sensor; and
determining whether a pair of the obtained capacitance distribution and imprint image data matches a pair of a pre-registered capacitance distribution and imprint image data, or one of pairs of a pre-registered capacitance distribution and imprint image data.

3. The method according to claim 1 further comprising identifying or performing an authentication of a user associated with the artificial object when the artificial object is identified.

4. The method according to claim 1 further comprising identifying a user's intention associated with the artificial object when the artificial object is identified.

5. The method according to claim 1 further comprising:
using the obtained capacitance distribution as an encryption key, a decryption key, a private key, an unlock key or an identifier; or
using the obtained capacitance distribution as a seed for generating an encryption key, a decryption key, a private key, an unlock key or an identifier when the artificial object is identified.

6. The method according to claim 1, wherein the determination comprises:
determining whether the whole or parts of the obtained capacitance distribution matches the whole or parts of a pre-registered capacitance distribution or the whole or parts of one of the pre-registered capacitance distributions; or
determining whether all or parts of feature points of the obtained capacitance distribution match all or parts of feature points of a pre-registered capacitance distribution or all or parts of one of the pre-registered capacitance distributions.

7. The method according to claim 1, wherein, when at least one predefined surface of the artificial object are in contact with a surface of the sensor, the measured capacitances are capacitances measured at points which are in contact with the surface of the sensor, capacitances measured at points which are not in contact with the surface of the sensor, or a combination of these.

8. The method according to claim 1, wherein the measurement capacitances are capacitances measured when the artificial objects is not in contact with a surface of the sensor.

9. The method according to claim 1, wherein the evaluation levels are expressed in a manner of gray represented by multi-bits.

10. The method according to claim 1, wherein the predefined surfaces of the artificial object has at least one recess which are with or without different levels of unevenness and which are vertically and/or horizontally composed of a plurality of materials having different electric conductivities or dielectric constants.

11. The method according to claim 10, wherein the materials of the artificial object are selected from a group consisting of at least one metal, at least one conductive polymer, at least one conductive filler, at least one conductive adhesive, at least one conductive coating material, and a combination of these.

12. The method according to claim 11, wherein the plurality of materials are disposed alternately or in a random, gradient, or grid manner.

13. The method according to claim 1, wherein at least one predefined surface of the artificial object have at least one recess and a side wall or bottom of the recess is oblique to a surface other than the surface of the recess.

14. The method according to claim 1, wherein the artificial object has at least one hollow in a variable proximity position of the surface.

15. The method according to claim 1, wherein at least one predefined surface of the artificial object is covered with at least one conductive polymer or painted with at least one conductive coating material.

16. A system, comprising:
a processor; and
a memory storing a program, which, when executed on the processor, performs an operation for identifying an artificial object, the operation comprising:
receiving raw capacitance data of the artificial object which is obtained by measuring at least one electrode in a sensor at least one predefined surfaces of the artificial object placed against the sensor
converting each of the obtained capacitance data into an evaluation level in an evaluation system having more than two evaluation levels, to obtain a capacitance distribution on the surface of the artificial object;
determining whether the obtained capacitance distribution matches a pre-registered capacitance distribution or one of pre-registered capacitance distributions; and
concluding that the artificial object is identified if the determination result is positive or the artificial object is not identified if the determination result is not positive
wherein the at least one predefined surfaces of the artificial object are composed of materials selected from a group including at least one metal, at least one conductive polymers, at least one conductive fillers, at least one conductive adhesives, at least one conductive coating materials, and/or a combination of the group.

17. The system according to claim 16, wherein the predefined surface of the artificial object is a face of a signet, and the operation further comprising receiving imprint image data which is obtained by measuring the same part of the artificial object and identifying imprint image data for the face of the signet, using the sensor, and the determination comprises:
determining whether a pair of the obtained capacitance distribution and imprint image data matches a pair of a pre-registered capacitance distribution and imprint image data or one of pairs of a pre-registered capacitance distribution and imprint image data.

18. The system according to claim 16, wherein the operation further comprising identifying or performing an authentication of a user associated with the artificial object when the artificial object is identified.

19. The system according to claim 16, wherein the operation further comprising identifying a user's intention associated with the artificial object when the artificial object is identified.

20. The system according to claim 16, the operation further comprising:
using the obtained capacitance distribution as an encryption key, a decryption key, a private key, an unlock key or an identifier; or
using the obtained capacitance distribution as a seed for generating an encryption key, a decryption key, a private key, an unlock key or an identifier when the artificial object is identified.

21. The system according to claim 16, wherein the determination comprises:
determining whether the whole or parts of the obtained capacitance distribution matches the whole or parts of a pre-registered capacitance distribution or the whole or parts of one of pre-registered capacitance distributions; or
determining whether all or parts of feature points of the obtained capacitance distribution match all or parts of feature points of a pre-registered capacitance distribution or all or parts of one of pre-registered capacitance distributions.

22. A computer readable non-transitory article of manufacture tangibly embodying computer readable instructions which, when executed, cause a computer to carry out the steps of a method comprising:
receiving raw capacitance data of an artificial object which is obtained by measuring with at least one electrodes in a sensor at least one predefined surfaces of the artificial object placed against the sensor;
converting each of the obtained capacitance data into an evaluation level in an evaluation system having more than two evaluation levels, to obtain a capacitance distribution on the surface of the artificial object;
determining whether the obtained capacitance distribution matches a pre-registered capacitance distribution or one of pre-registered capacitance distributions; and
concluding that the artificial object is identified if the determination result is positive or the artificial object is not identified if the determination result is not positive
wherein the at least one predefined surfaces of the artificial object are composed of materials selected from a group including at least one metal, at least one conductive polymers, at least one conductive fillers, at least one conductive adhesives, at least one conductive coating materials, and/or a combination of the group.

23. The method according to claim 22,
wherein the artificial object can be associated with a capacitance distribution, the capacitance distribution is obtained by converting each of capacitance data into an evaluation level in an evaluation system having at least two evaluation levels, the capacitance data being obtained by measuring with at least one electrode in a sensor at least one predefined surfaces of the artificial object placed against the sensor; and wherein at least one predefined surfaces of the artificial object or parts of the artificial object which are in variable proximity positions of at least one predefined surfaces of the artificial object are composed of materials selected from a group consisting of at least one metals, at least one conductive polymers, at least one conductive fillers, at least one conductive adhesives, at least one conductive coating materials, and a combination of these.

24. The method according to claim 23, wherein at least one predefined surfaces of the artificial object or parts of the artificial object which are in a variable proximity position of at least one predefined surfaces are composed of a plurality of materials having different electric conductivities or dielectric constants.

25. The method according to claim 23, wherein the plurality of materials are disposed alternately, or in a random, gradient, or grid manner.

26. A method for identifying an artificial object that has conductivity, the method comprising:

receiving raw capacitance data of the artificial object which is obtained by measuring at least one electrode in a sensor at least one predefined surfaces of the artificial object placed against the sensor;

converting each of the obtained capacitance data into an evaluation level in an evaluation system having at least two evaluation levels, to obtain a capacitance distribution on the surface of the artificial object;

determining whether the obtained capacitance distribution matches a pre-registered capacitance distribution or one of pre-registered capacitance distributions;

concluding that the artificial object is identified if the determination result is positive; and using the obtained capacitance distribution as an encryption key, decryption key, or an identifier; or using the obtained capacitance distribution as a seed for generating an encryption key, decryption key or an identifier when the artificial object is identified.

27. The method according to claim 26, wherein the predefined surface of the artificial object is a face of a signet, and the method further comprising:

receiving imprint image data which is obtained by measuring the same part of the artificial object;

identifying imprint image data for the face of the signet, using the sensor; and determining whether a pair of the obtained capacitance distribution and imprint image data matches a pair of a pre-registered capacitance distribution and imprint image data, or one of pairs of a pre-registered capacitance distribution and imprint image data.

28. The method according to claim 26 further comprising identifying or performing an authentication of a user associated with the artificial object when the artificial object is identified.

29. The method according to claim 26 further comprising identifying a user's intention associated with the artificial object when the artificial object is identified.

30. The method according to claim 26, wherein the determination comprises:

determining whether the whole or parts of the obtained capacitance distribution matches the whole or parts of a pre-registered capacitance distribution or the whole or parts of one of the pre-registered capacitance distributions; or determining whether all or parts of feature points of the obtained capacitance distribution match all or parts of feature points of a pre-registered capacitance distribution or all or parts of one of the pre-registered capacitance distributions.

31. The method according to claim 26, wherein, when at least one predefined surface of the artificial object are in contact with a surface of the sensor, the measured capacitances are capacitances measured at points which are in contact with the surface of the sensor, capacitances measured at points which are not in contact with the surface of the sensor, or a combination of these.

32. The method according to claim 26, wherein the measurement capacitances are capacitances measured when the artificial objects is not in contact with a surface of the sensor.

33. The method according to claim 26, wherein the evaluation levels are expressed in a manner of gray represented by multi-bits.

34. The method according to claim 26, wherein the predefined surfaces of the artificial object has at least one recess which are with or without different levels of unevenness and which are vertically and/or horizontally composed of a plurality of materials having different electric conductivities or dielectric constants.

35. The method according to claim 34, wherein the materials of the artificial object are selected from a group consisting of at least one metal, at least one conductive polymer, at least one conductive filler, at least one conductive adhesive, at least one conductive coating material, and a combination of these.

36. The method according to claim 35, wherein the plurality of materials are disposed alternately or in a random, gradient, or grid manner.

37. The method according to claim 26, wherein at least one predefined surface of the artificial object have at least one recess and a side wall or bottom of the recess is oblique to a surface other than the surface of the recess.

38. The method according to claim 26, wherein the artificial object has at least one hollow in a variable proximity position of the surface.

39. The method according to claim 26, wherein at least one predefined surface of the artificial object is covered with at least one conductive polymer or painted with at least one conductive coating material.

40. A system, comprising:

a processor; and a memory storing a program, which, when executed on the processor, performs an operation for identifying an artificial object, the operation comprising:

receiving raw capacitance data of the artificial object which is obtained by measuring with at least one electrodes in a sensor at least one predefined surfaces of the artificial object placed against the sensor;

converting each of the obtained capacitance data into an evaluation level in an evaluation system having more than two evaluation levels, to obtain a capacitance distribution on the surface of the artificial object;

determining whether the obtained capacitance distribution matches a pre-registered capacitance distribution or one of pre-registered capacitance distributions;

concluding that the artificial object is identified if the determination result is positive or the artificial object is not identified if the determination result is not positive; and using the obtained capacitance distribution as an encryption key, a decryption key or an identifier; or using the obtained capacitance distribution as a seed for generating an encryption key, a decryption key or an identifier when the artificial object is identified.

41. The system according to claim 40, wherein the pre-defined surface of the artificial object is a face of a signet, and the operation further comprising receiving imprint image data which is obtained by measuring the same part of the artificial object and identifying imprint image data for the face of the signet, using the sensor, and the determination comprises:
    determining whether a pair of the obtained capacitance distribution and imprint image data matches a pair of a pre-registered capacitance distribution and imprint image data or one of pairs of a pre-registered capacitance distribution and imprint image data.

42. The system according to claim 40, wherein the operation further comprising identifying or performing an authentication of a user associated with the artificial object when the artificial object is identified.

43. The system according to claim 40, wherein the operation further comprising identifying a user's intention associated with the artificial object when the artificial object is identified.

44. The system according to claim 40, wherein the determination comprises:
    determining whether the whole or parts of the obtained capacitance distribution matches the whole or parts of a pre-registered capacitance distribution or the whole or parts of one of pre-registered capacitance distributions; or
    determining whether all or parts of feature points of the obtained capacitance distribution match all or parts of feature points of a pre-registered capacitance distribution or all or parts of one of pre-registered capacitance distributions.

* * * * *